(12) United States Patent
Zheng et al.

(10) Patent No.: US 10,353,912 B2
(45) Date of Patent: *Jul. 16, 2019

(54) NAVIGATION OF A DATA EXTRACTION GRAPH OF DATA AND METADATA FROM A DATA REPOSITORY

(71) Applicant: salesforce.com, inc., San Francisco, CA (US)

(72) Inventors: Zuye Zheng, San Francisco, CA (US); Amruta Moktali, San Francisco, CA (US); Suyog Anil Deshpande, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 465 days.

This patent is subject to a terminal disclaimer.

(21) Appl. No.: 14/749,109

(22) Filed: Jun. 24, 2015

(65) Prior Publication Data

US 2016/0103899 A1   Apr. 14, 2016

Related U.S. Application Data

(60) Provisional application No. 62/062,772, filed on Oct. 10, 2014, provisional application No. 62/062,753, filed on Oct. 10, 2014, provisional application No. 62/062,795, filed on Oct. 10, 2014.

(51) Int. Cl.
*G06F 16/25* (2019.01)
*G06F 16/28* (2019.01)
*G06F 16/901* (2019.01)

(52) U.S. Cl.
CPC .......... *G06F 16/254* (2019.01); *G06F 16/284* (2019.01); *G06F 16/289* (2019.01); *G06F 16/9024* (2019.01)

(58) Field of Classification Search
CPC .................. G06F 17/2247; G06F 17/2432
See application file for complete search history.

(56) References Cited

U.S. PATENT DOCUMENTS

| | | | |
|---|---|---|---|
| 6,092,062 A | 7/2000 | Lohman et al. | |
| 6,708,186 B1 | 3/2004 | Claborn et al. | |
| 8,682,932 B2 | 3/2014 | Raghavan et al. | |
| 9,244,979 B2 | 1/2016 | Zhang et al. | |
| 9,703,830 B2 | 7/2017 | Appavu | |
| 9,734,180 B1 | 8/2017 | Graham et al. | |
| 2004/0006561 A1 | 1/2004 | Nica | |
| 2005/0033741 A1 | 2/2005 | Dombroski et al. | |
| 2005/0060292 A1 | 3/2005 | Day et al. | |

(Continued)

*Primary Examiner* — Usmaan Saeed
*Assistant Examiner* — David M Nafziger
(74) *Attorney, Agent, or Firm* — Elliott, Ostrander & Preston, P.C.

(57) ABSTRACT

Navigation of a data extraction graph is described. The data extraction graph may be a graph representation of data and metadata in an object-oriented database. In one example, a data extraction definition of metadata from a database system is presented in a graph format. The graph format is transformed into a linear object tree, and/or an object list. Navigation commands are received from a user to navigate the transformed graph format. Selections of objects are received from the user to select objects in the transformed graph format. A summary view of the selected objects is then provided in the transformed graph format.

20 Claims, 20 Drawing Sheets

(56) References Cited

U.S. PATENT DOCUMENTS

| | | |
|---|---|---|
| 2007/0219969 A1 | 9/2007 | Su et al. |
| 2007/0219977 A1 | 9/2007 | Su et al. |
| 2007/0250473 A1 | 10/2007 | Larson et al. |
| 2007/0276709 A1 | 11/2007 | Trimby et al. |
| 2008/0040367 A1 | 2/2008 | Bitonti et al. |
| 2008/0071785 A1 | 3/2008 | Kabra et al. |
| 2008/0097959 A1 | 4/2008 | Chen et al. |
| 2009/0024590 A1* | 1/2009 | Sturge .............. G06F 17/30893 |
| 2009/0119399 A1 | 5/2009 | Hussain et al. |
| 2009/0228434 A1 | 9/2009 | Krishnamurthy et al. |
| 2010/0079459 A1* | 4/2010 | Breeds .................. G06T 11/206 345/440 |
| 2010/0083172 A1* | 4/2010 | Breeds .................. G06F 3/0482 715/810 |
| 2011/0016154 A1 | 1/2011 | Goyal et al. |
| 2011/0276789 A1 | 11/2011 | Chambers et al. |
| 2012/0071146 A1* | 3/2012 | Shrivastava ...... G06F 17/30893 455/414.3 |
| 2012/0240236 A1* | 9/2012 | Wyatt .................... G06F 21/564 726/25 |
| 2012/0278897 A1* | 11/2012 | Ang .................... H04L 61/2596 726/26 |
| 2012/0284255 A1 | 11/2012 | Schechter et al. |
| 2012/0310916 A1 | 12/2012 | Abadi et al. |
| 2012/0317149 A1 | 12/2012 | Jagota et al. |
| 2013/0138629 A1 | 5/2013 | Rehmattullah |
| 2013/0151536 A1 | 6/2013 | Akoglu et al. |
| 2013/0166507 A1* | 6/2013 | Staczek ............. G06F 17/30575 707/625 |
| 2013/0166886 A1 | 6/2013 | Sasanka et al. |
| 2013/0311443 A1* | 11/2013 | Bolotnikoff ....... G06F 17/30448 707/714 |
| 2014/0019870 A1* | 1/2014 | Paniagua .............. G06F 3/0484 715/738 |
| 2014/0075161 A1 | 3/2014 | Zhang et al. |
| 2014/0136520 A1 | 5/2014 | Digana |
| 2014/0172810 A1 | 6/2014 | Paradies et al. |
| 2014/0230070 A1 | 8/2014 | Ramamurthy et al. |
| 2014/0279838 A1* | 9/2014 | Tsirogiannis ..... G06F 17/30292 707/603 |
| 2014/0310302 A1 | 10/2014 | Wu et al. |
| 2015/0007154 A1 | 1/2015 | Bharadwaj et al. |
| 2015/0040052 A1* | 2/2015 | Noel ................... G06F 3/04847 715/771 |
| 2015/0088919 A1 | 3/2015 | Hunter et al. |
| 2015/0089021 A1* | 3/2015 | Bergbauer ............. G06Q 50/08 709/217 |
| 2015/0112998 A1* | 4/2015 | Shankar ........... G06F 17/30312 707/741 |
| 2015/0127632 A1 | 5/2015 | Khaitan et al. |
| 2015/0169685 A1 | 6/2015 | Eliás et al. |
| 2015/0220530 A1 | 8/2015 | Banadaki et al. |
| 2015/0234549 A1* | 8/2015 | Mingione ............. G06F 3/0482 715/739 |
| 2015/0261507 A1 | 9/2015 | Bhagavan et al. |
| 2015/0278304 A1 | 10/2015 | Konik et al. |
| 2015/0347629 A1 | 12/2015 | Pajor et al. |
| 2015/0356166 A1 | 12/2015 | Daenen et al. |
| 2015/0363461 A1 | 12/2015 | Behal et al. |
| 2015/0363463 A1 | 12/2015 | Mindnich et al. |
| 2015/0363465 A1 | 12/2015 | Bordawekar et al. |
| 2015/0378868 A1 | 12/2015 | Levit-Gurevich et al. |
| 2016/0103931 A1 | 4/2016 | Appavu et al. |

* cited by examiner

FIELDS

| Select Fields | Fields (12) | Relationships |
|---|---|---|
| Search Fields | | |
| ☐ Name ▲ | Type | |
| ☐ Billing State | Dimension | |
| ☐ Billing Zip | Measure | |
| ☐ CFL Portfolio | Dimension | |
| ☐ Chat ID | Measure | |
| ☐ Client ID | Measure | |
| ■ Create Date | Dimension | |
| ☐ Date to Revisit | Date | |
| ☐ Deal Champion | Date | |
| ☐ Deal Number | Measure | |
| ■ Mail ID | Dimension | |
| ☐ May Edit | Measure | |
| ☐ May Edit | Dimension | |
| ☐ Order ID | Measure | |

906

RELATIONSHIPS

| Select Related Objects | Fields (12) | Relationships |
|---|---|---|
| Search Fields | | |
| | Related Field ▲ | Related Object | Type |
| JOIN | Created By | User | C |
| DELETE | Op_Owner | User | S |
| JOIN | Opp_Last_Modife... | User | C |
| JOIN | Blah Blah | Blah Blah | C |
| JOIN | Blah Blah | Blah Blah | C |
| DELETE | Blah Blah | Blah Blah | S |
| DELETE | Blah Blah | Blah Blah | S |
| JOIN | Blah Blah | Blah Blah | S |
| JOIN | Blah Blah | Blah Blah | S |
| JOIN | Blah Blah | Blah Blah | S |
| JOIN | Blah Blah | Blah Blah | S |
| JOIN | Blah Blah | Blah Blah | S |

908

HOVER STATE

| Select Related Objects | Fields (12) | Relationships |
|---|---|---|
| Search Fields | | |
| | Related Field ▲ | Related Object | Type |
| JOIN | Created By | User | C |
| DELETE | Op_Owner | User | S |
| JOIN | Opp_Last_Modife... | User | C |
| JOIN | Blah Blah [Opp_Last_Modified_By_LongObjectNameHere] | | C |
| JOIN | Blah Blah | Blah Bla [Custom Object] | S |
| DELETE | Blah Blah | Blah Blah | S |
| DELETE | Blah Blah | Blah Blah | S |
| JOIN | Blah Blah | Blah Blah | S |
| JOIN | Blah Blah | Blah Blah | S |
| JOIN | Blah Blah | Blah Blah | S |
| JOIN | Blah Blah | Blah Blah | S |
| JOIN | Blah Blah | Blah Blah | S |

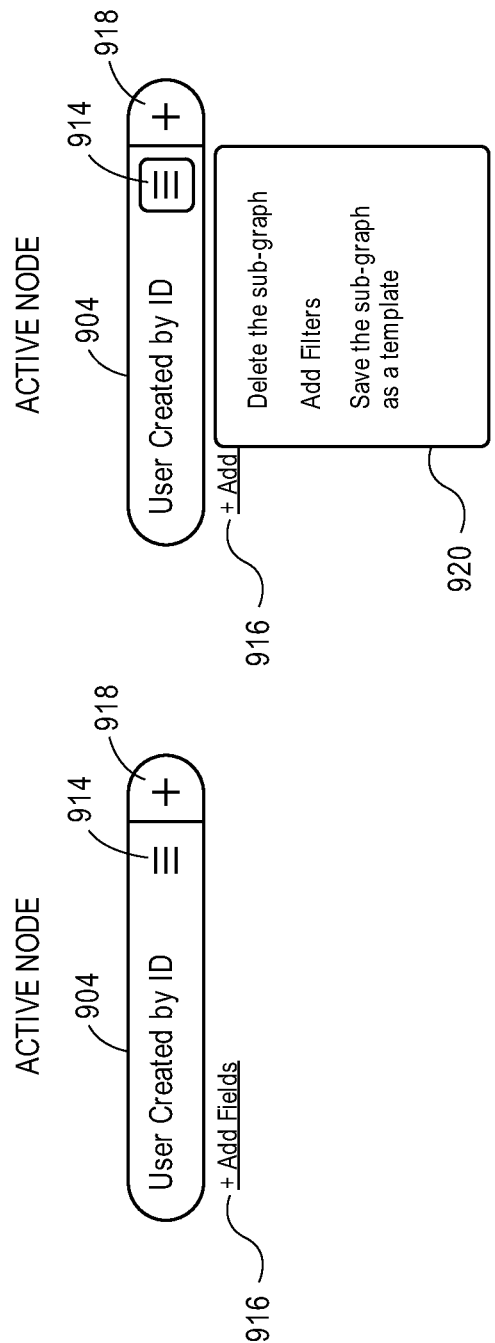

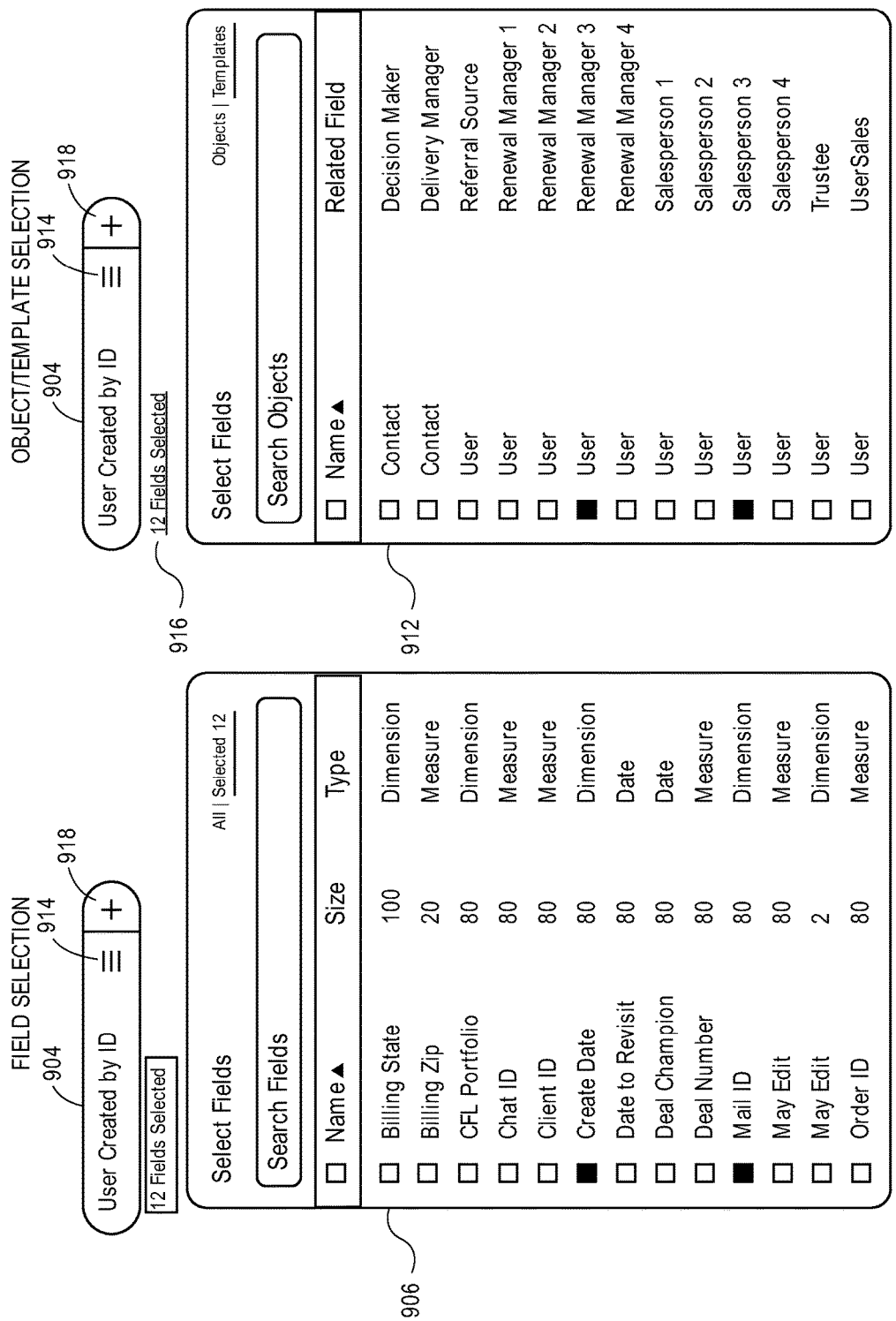

Insights

☐ Marc's Team Insights

Data Preview

| custID | custName | Product | Sold | Revenue | Date | City | Country | Channel | oppOwner | Zip |
|---|---|---|---|---|---|---|---|---|---|---|
| Measure ▶ | Dimension ▶ | Measure ▶ | Dimension ▶ | Dimension ▶ | Date ▶ | Measure ▶ | Measure ▶ | Dimension ▶ | Date ▶ | Di ▶ |
| 23262 | Candice Levy | SUPA101 | 117 | $8,000 | 2014-08-09 | Chicago | United Stat... | Phone | John Smith | 32 |
| 23263 | Xerxes Smith | DETA200 | 73 | $608,000 | 2014-04-02 | Paris | France | Web | Adam Frank | 65 |
| 23264 | Levi Douglas | DETA800 | 205 | $114,000 | 2014-01-03 | Tokyo | Japan | Phone | Ashley Bolt... | 11 |
| 23265 | Uriel Benton | SUPA104 | 14 | $2,019,000 | 2014-12-09 | Berlin | Germany | Web | Sam Brown | 14 |
| 23266 | Celeste Pugh | SUPA200 | 170 | $974,000 | 2014-02-03 | Dublin | Ireland | Phone | Sarah Rae | 94 |
| 23267 | Vance Campos | SUPA100 | 129 | $73,000 | 2014-04-03 | Moscow | Russia | Web | Jean White | 32 |
| 23268 | Latifah Wall | SUPA103 | 82 | $80,300 | 2014-09-09 | Beijing | China | Web | Mike Jones | 65 |
| 23269 | Jane Herman... | SUPA200 | 116 | $100,000 | 2014-08-02 | Yokohama | Japan | Phone | Mark Finn | 43 |

[ Cancel ]  [ Save Changes ]

FIG. 15

Accounts -> Territory -> Territory Manager User

-> Created By User

FIG. 17

NAVIGATION OF A DATA EXTRACTION GRAPH OF DATA AND METADATA FROM A DATA REPOSITORY

CROSS-REFERENCE TO RELATED APPLICATIONS

This application claims the benefit of and priority to the following U.S. Provisional Patent Applications No. 62/062,772, entitled "GRAPH REPRESENTATION OF DATA EXTRACTION FOR USE WITH A DATA REPOSITORY" by Zuye Zheng, filed Oct. 10, 2014; No. 62/062,795, entitled "DATAFLOW OPTIMIZATION FOR EXTRACTIONS FROM A DATA REPOSITORY" by Zuye Zheng, filed Oct. 10, 2014; and No. 62/062,753, entitled "NAVIGATION OF A DATA EXTRACTION GRAPH OF DATA AND METADATA FROM A DATA REPOSITORY" by Zuye Zheng, filed Oct. 10, 2014, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating navigation of a data extraction graph of data and metadata from a data repository.

BACKGROUND

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

One reason to retrieve data from a database is to expose the data to analytical tools. This allows the quality of the data and the structure of the database to be analyzed and quantified. The user may then make corrections and adjustments to improve the data quality and the quality and usability of the database. Rather than analyze all of the stored data, some analytical tools provide better results if some portion of the data is retrieved and analyzed. To retrieve a portion of the data, the user must make selections as to which data to retrieve.

When selecting data to retrieve, conventional data storage repository systems require the user to manually find and specify the relationship fields between two objects to join those objects through a tree chart. Various objects, their children, parents, etc. are picked by traversing through the hierarchy. Their relationships are not represented in-line. Relationship selection happens on a separate interface after selecting the objects for extraction. A SQL (Structured Query Language) query must typically be written with only minimal visual builder tools. Users are unable to see the end data format of the extract. The data extraction definition uses metadata to define the extraction for relational systems and presents the definition in a graph format.

When retrieving data, conventional data storage repository systems traverse an object-relationship graph once and turn each graph node into a sequential list of steps to take without considering the results that may be reused from steps in other branches or nodes of the graph, some of which may even occur after. The steps for data extraction are then executed in the order in which they occur in the graph.

Conventional data storage repository systems use a data extraction definition to support searching and extracting data from the repository system. The data extraction definition uses metadata to define the extraction for relational systems and presents the definition in a graph format.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

BRIEF DESCRIPTION OF THE DRAWINGS

In the following drawings like reference numbers are used to refer to like elements. Although the following figures depict various examples, one or more implementations are not limited to the examples depicted in the figures.

FIG. 10 illustrates a user interface for field option selection with a data graph representation mechanism according to one embodiment;

FIG. 11 illustrates a user interface for additional option selections with a data graph representation mechanism according to one embodiment;

FIG. 12 illustrates a user interface for structural option selection with a data graph representation mechanism according to one embodiment;

FIG. 13 illustrates a user interface for adding fields with a data graph representation mechanism according to one embodiment;

FIG. 14 illustrates a user interface for adding objects in a field with a data graph representation mechanism according to one embodiment;

FIG. 15 illustrates a data preview of de-normalized data for a data extraction definition according to one embodiment;

FIG. 17 illustrates a graph with multiple nodes for a data flow optimization mechanism according to one embodiment;

DETAILED DESCRIPTION

Figure 1:
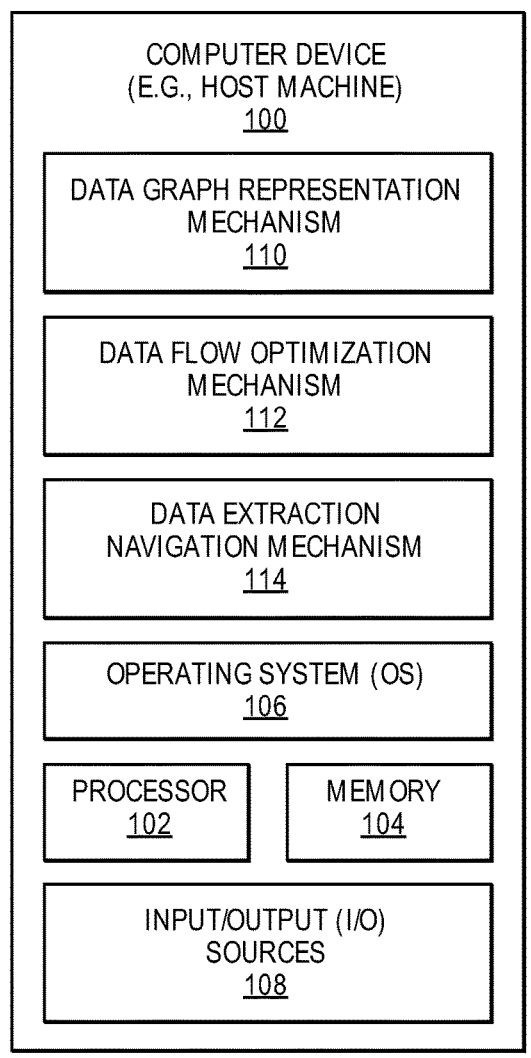
FIG. 1 illustrates a computing device employing a data graph representation mechanism, a data flow optimization mechanism and a data extraction navigation mechanism according to one embodiment.

Methods and systems are provided to represent data extraction as a graph according to an embodiment, for navigating a data extraction graph according to an embodiment, and for optimizing data extraction according to an embodiment.

Embodiments provide for facilitating faster and more accurate data extraction by introducing a novel and innovative data graph representation mechanism for data storage repositories. In one embodiment, objects are joined automatically with a simple selection rather than having to manually specify the relationship.

In one embodiment, a user visually and interactively defines the relationships, joins and fetches, which the users would have to do in SQL otherwise. The underlying schema of the database is visually represented in a multitenant environment for the query to be built. In some embodiments, the system leverages the Salesforce.com® UDD (Universal Data Dictionary) to help the user define the possible joins and extractions. The user does not need to manually define the join condition, the metadata stored in lookup field definitions is used to display and finally assemble these join conditions. The SOQL™ (Salesforce Object Query Language) for the flattened dataset and the Insights ELT (Extract Load Transform) workflow definition are generated.

In one embodiment, users preview the data that will be extracted in the final denormalized form while building the extract and relationship graph. This provides a way to edit the metadata and clean the data. The preview also provides sampling information of the data to assist the user in graph building. The sample data can also be visualized and explored to identify potential data quality issues.

Embodiments provide for facilitating faster and more accurate data extraction by introducing a novel and innovative dataflow optimization mechanism for data storage repositories. In one embodiment, an object-relationship graph is traversed through multiple passes before data is extracted. This may help to coalesce extraction fields on the same object.

In one embodiment, the entire object-relationship graph is traversed once to get a high level view and figure out what is needed and what can be reused so that when a final list of steps is generated, shared and reusable steps are placed at the top and reused in later steps. This enhances efficiency because graph traversal is simpler than executing the extraction steps.

In one embodiment, further optimizations are generated when the extract also defines specific fields that need to be extracted. The extract is de-duplicated and a super set of fields is extracted and a subset of the extract is used for specific joins.

In one embodiment, various objects-relationships are picked and represented as a graph in a single screen. This allows users to add new objects and relationships at any stage in the selection process.

Embodiments provide for facilitating end-to-end integrity and stronger guarantees by introducing a novel and innovative data extraction navigation mechanism for data storage repositories. In one embodiment, a way to explore and navigate through a graph by transforming the graph into other formats or an alternative view of the graph for example a linear object tree or an object list or JSON (JavaScript® Object Notation) is provided.

In one embodiment, a summary view is provided of all the objects that have been selected along with the object hierarchy. Alternate ways are provided for users to see the object hierarchy. It is as if the user can shop different products on an e-commerce site, but at the end a summary view is shown, a shopping cart, before the purchase is finalized.

Embodiments provide a downloadable JSON file of the object hierarchy the user is building. This provides a way for users to download the selection on their local machines, tweak it if they want to and then reuse it when they are building another object extraction.

It is contemplated that embodiments and their implementations may be used in particular with a multi-tenant database system ("MTDBS") and can also be used in other environments, such as a client-server system, a mobile device, a personal computer (PC), a web services environment, etc. However, for the sake of brevity and clarity, throughout this document, embodiments are described with respect to a multi-tenant database system, such as that provided as a Salesforce.com® service.

In conventional models, index tables are severely limited in that an index table can only be created, for example, by a limitation of up to two columns and each column with up to three data types. As a result, a large number of index tables and/or skinny tables are required to be created and maintained and further, when they are relied upon for reference (such as when customer queries are to be processed) which can all be expensive, inefficient, and not scalable.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers. As used herein, the term "query plan" refers to a set of steps used to access information in a database system.

Embodiments are described with reference to an embodiment in which techniques for facilitating management of data are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a computing device 100 employing a data graph representation mechanism 110 according to some embodiments. In one embodiment, computing device 100 serves as a host machine for representing data extraction as a graph 110 for facilitating the use of a data extraction graph of data and metadata from a data repository in a multi-tiered, multi-tenant, environment.

The computing device 100 further employs a dataflow optimization mechanism 112 according to some embodiments. The dataflow optimization mechanism 110 for facilitates optimization of dataflow when executing a data extraction graph of data and metadata from a data repository in a multi-tiered, multi-tenant, environment.

The computing device 100 further employs a data extraction graph navigation mechanism 114 according to some embodiments. The data extraction graph navigation facilitates navigation of a data extraction graph of data and metadata from a data repository in a multi-tiered, multi-tenant, environment.

The term "user" may refer to a system user, such as, but not limited to, a software/application developer, a system administrator, a database administrator, an information technology professional, a program manager, product manager, etc. The term "user" may also refer to an end-user, such as, but not limited to, an organization (e.g., a business, a company, a corporation, a non-profit entity, an institution, an agency, etc.) serving as a customer or client of the provider (e.g., Salesforce.com®) of mechanism 110 or an organization's representative, such as a salesperson, a sales manager, a product manager, an accountant, a director, an owner, a president, a system administrator, a computer programmer, an information technology (IT) representative, etc.

It is to be noted that any references to software codes, data and/or metadata (e.g., Customer Relationship Model (CRM) data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery®, Developerforce™, Visualforce™, Service Cloud Console Integration Toolkit® ("Integration Toolkit" or "Toolkit"), Platform on a Service™ (PaaS), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion® Limited, now known and trading as BlackBerry®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™ systems, etc.), e-readers (e.g., Kindle® by Amazon.com®, Nook® by Barnes and Nobles®, etc.), Global Positioning System (GPS)-based navigation systems, cable setup boxes, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", and "software package" may be used interchangeably throughout this document. Moreover, terms like "job", "input", "request" and "message" may be used interchangeably throughout this document.

Figure 2:
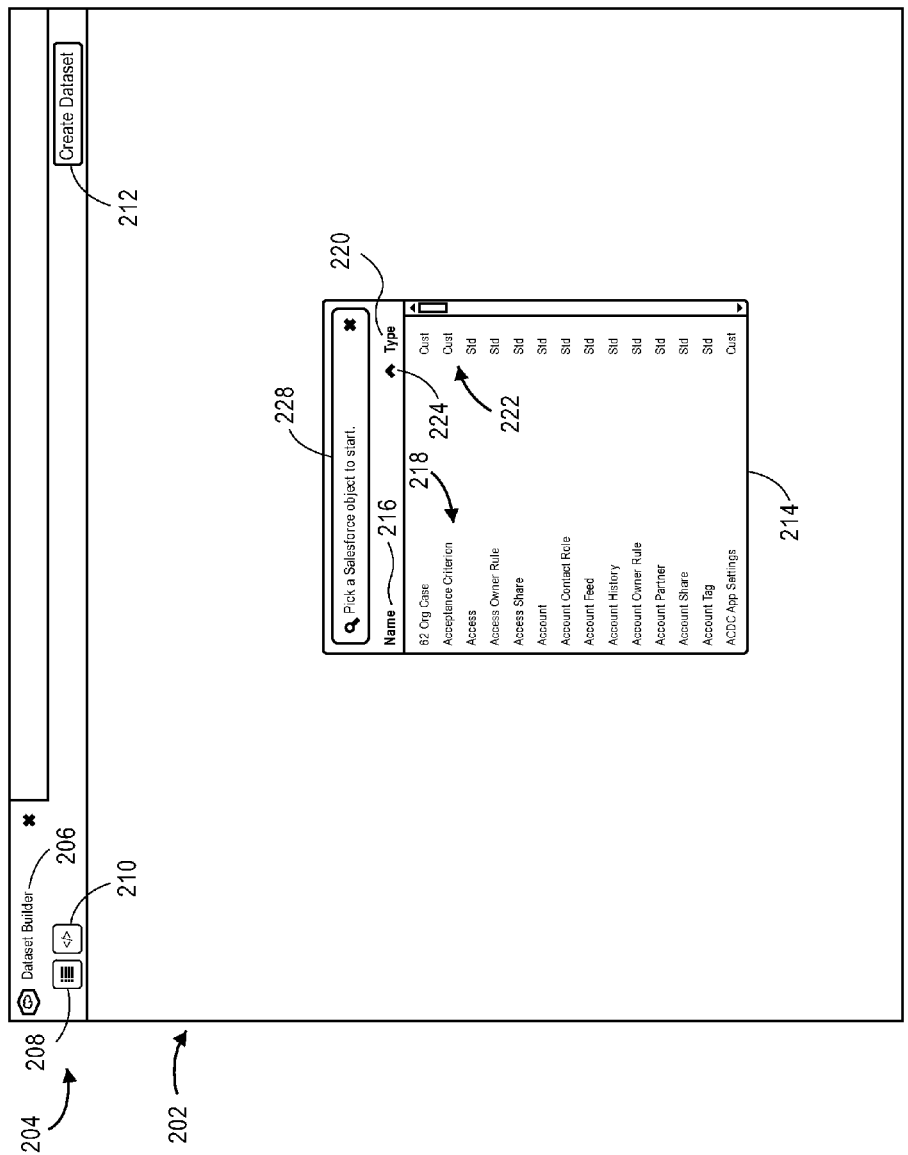
FIG. 2 illustrates a user interface for a data graph representation mechanism according to one embodiment.

FIG. 2 is a diagram of a user interface for a data graph representation mechanism. The user interface has a presentation window 202 and a title bar 204. In the title bar, there is a title "Dataset Builder" 206 for the interface, a list button 208 and a source code button 210. The list button causes the data extraction navigation mechanism to generate an object list view of the data graph representation. The source code button causes the data extraction navigation mechanism to display the source code that has been generated using the data graph mechanism as described below. When the dataset is fully defined, a create or run button 212 labeled as "Create Dataset" may be used to cause the mechanism to retrieve the dataset as defined by the representation.

In the presentation window 202, the user is provided with a variety of different options for selecting a root object. A selection dialog box 214 presents a list 218 of all possible root objects. The objects are presented using a name column 216 and a type column 220. The names 218 are presented in alphabetical order as shown with the types 222 presented next to each object. A sort button 224 allows the user to sort the objects in some other way, such as type, size, or using any other desired attribute. Alternatively, a search box 228 is presented to allow the user to search for a particular object. The presentation window and selection dialog box is provided as an example. The root object may be selected in any other way to suit particular databases, datasets, and user requirements.

Figure 3:
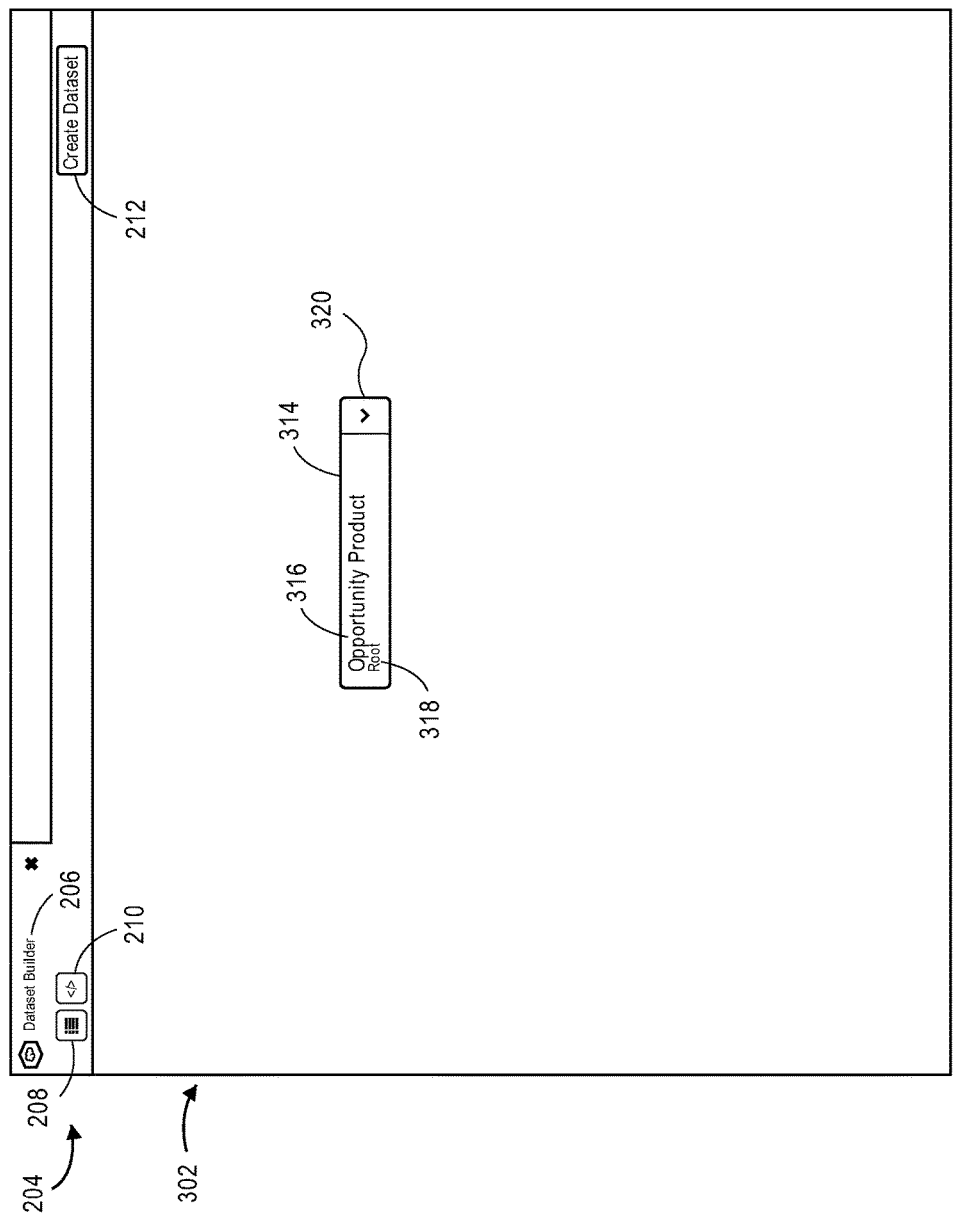
FIG. 3 illustrates a user interface for a data graph representation mechanism after selection of a root object according to one embodiment.

FIG. 3 is a diagram of the user interface after the user has selected a root object for the dataset. The user interface has the same title bar 204. In the presentation window 302 a selected object 314 is presented. In this example the object is identified with a title 316, "Opportunity Product" and with a level 318, a "root object." A drop-down list selection button 320 allows the user to view attributes or subnodes of the root object.

Figure 4:
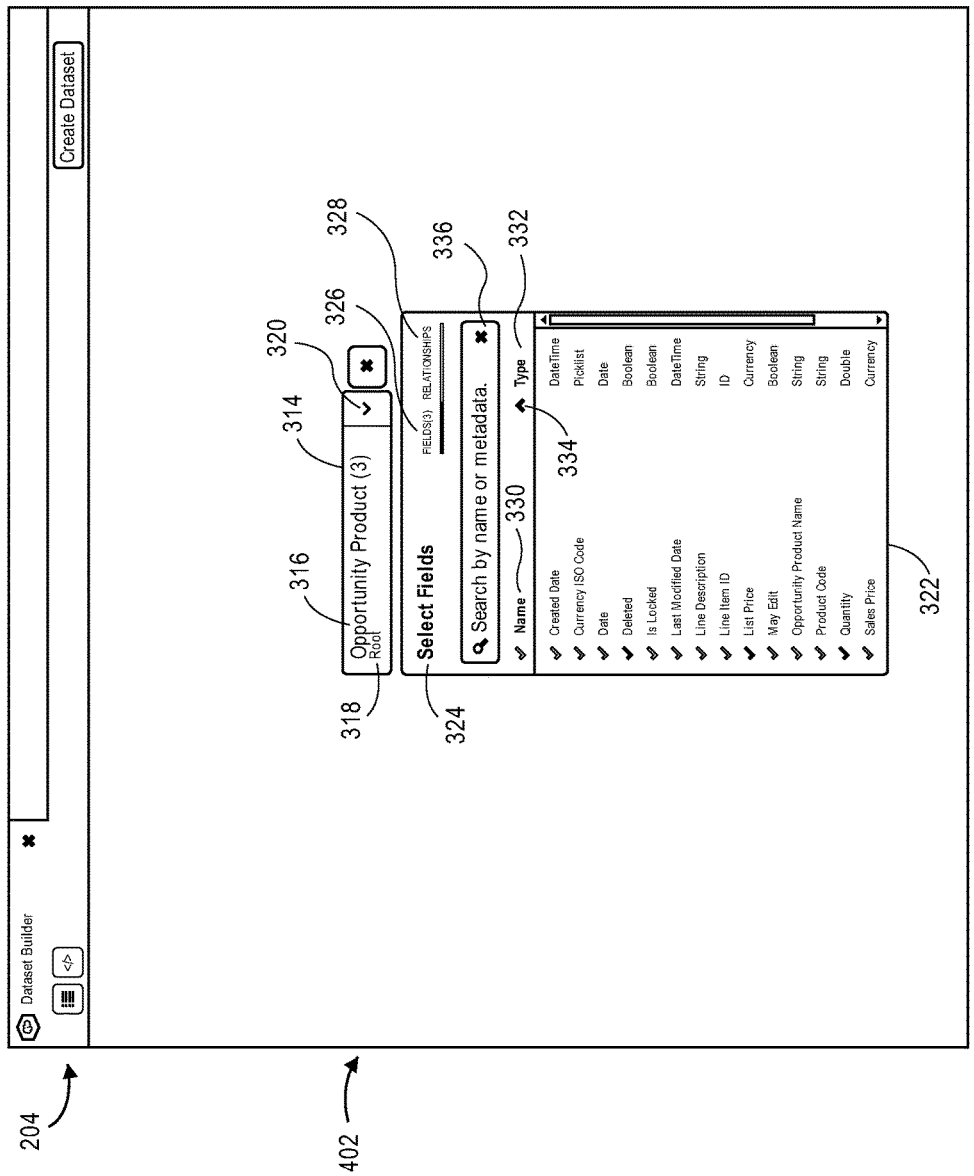
FIG. 4 illustrates a user interface for a data graph representation mechanism after selection of a list button according to one embodiment.

FIG. 4 is a diagram of the user interface after the user has selected the list button 320. The user interface has the same title bar. In the presentation window 402, the root object 314 is displayed with its title 316 and level 318. The drop-down list is presented in a new window 322 with a title 324. This window allows the user to select fields to associate with the root object. The available fields are listed by name 330 and the type 332 is provided for each one. A sort button 334 allows the user to view the list in different ways to allow the user to more easily find the intended fields. In addition a search box 336 is provided to allow for more direct access to a particular field.

In the illustrated example, three fields are selected as indicated on the object title 316 and the fields header 326 by the number 3 in parentheses. They fields are "Deleted," "List Price," and "Quantity." The user may select as many fields as desired and these will be shown in some way as highlighted, marked with a check, or in some other way in the list box. The field selection box allows the user to designate the field values that will be retrieved when the data set is run. In this way, the user selects only a part of the dataset for retrieval. For Opportunity ID only values for these three fields will be retrieved. The values for any other fields will not be retrieved.

Figure 5:
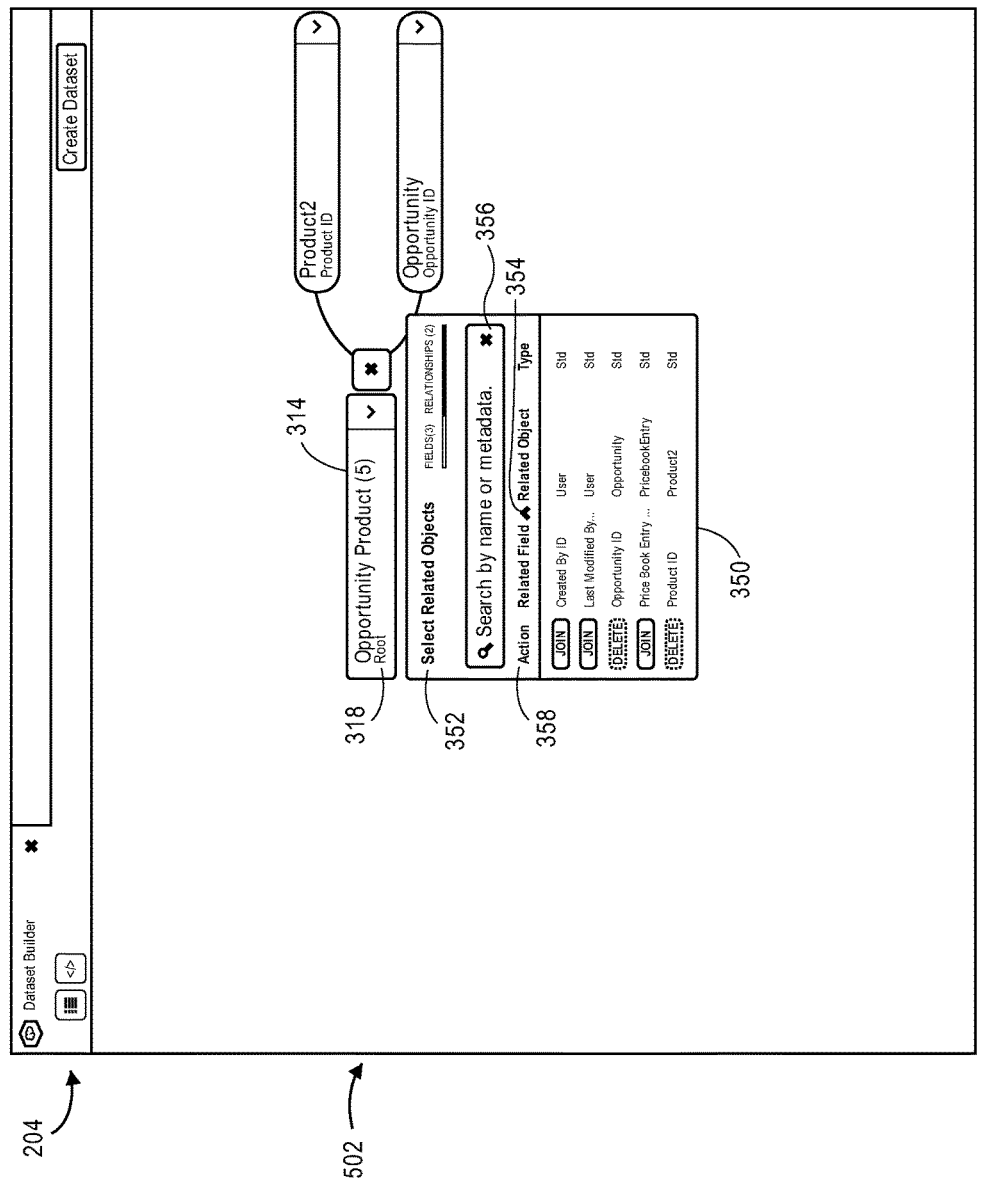
FIG. 5 illustrates a user interface for a data graph representation mechanism after selection of a relationships button according to one embodiment.

FIG. 5 is a diagram of the user interface after the user has selected the "Relationships" button 328 in the field selection dialog box 322 shown in FIG. 4. As a result, the dialog box has been changed to a related objects selection box 350. A title 352 identifies the box and the task as "Select Related Objects." For this dialog box many of the same tools may be used to aid in selecting objects. This includes a search box 356 and a sort button 354. The selected related objects are displayed in a list by Action, Related Field, Related Object, and Type. In this case five objects have been selected as indicated by "(5)" in the root object title bar 314 and in the "Relationships" button.

In the action column 358 of the box 350, the user is provided with the choice to join the related object or to delete a joined object. Two of the related objects have been joined, "Opportunity ID" and Product2." These are now shown as branches 340, 348 in the graph representation. The branches have titles 342, node identifiers 344, and list buttons 346. The list button may operate in a variety of different ways. For simplicity, the list button may be used to activate a drop-down list similar to the field and relationship dialog boxes shown for the root node.

Figure 6:
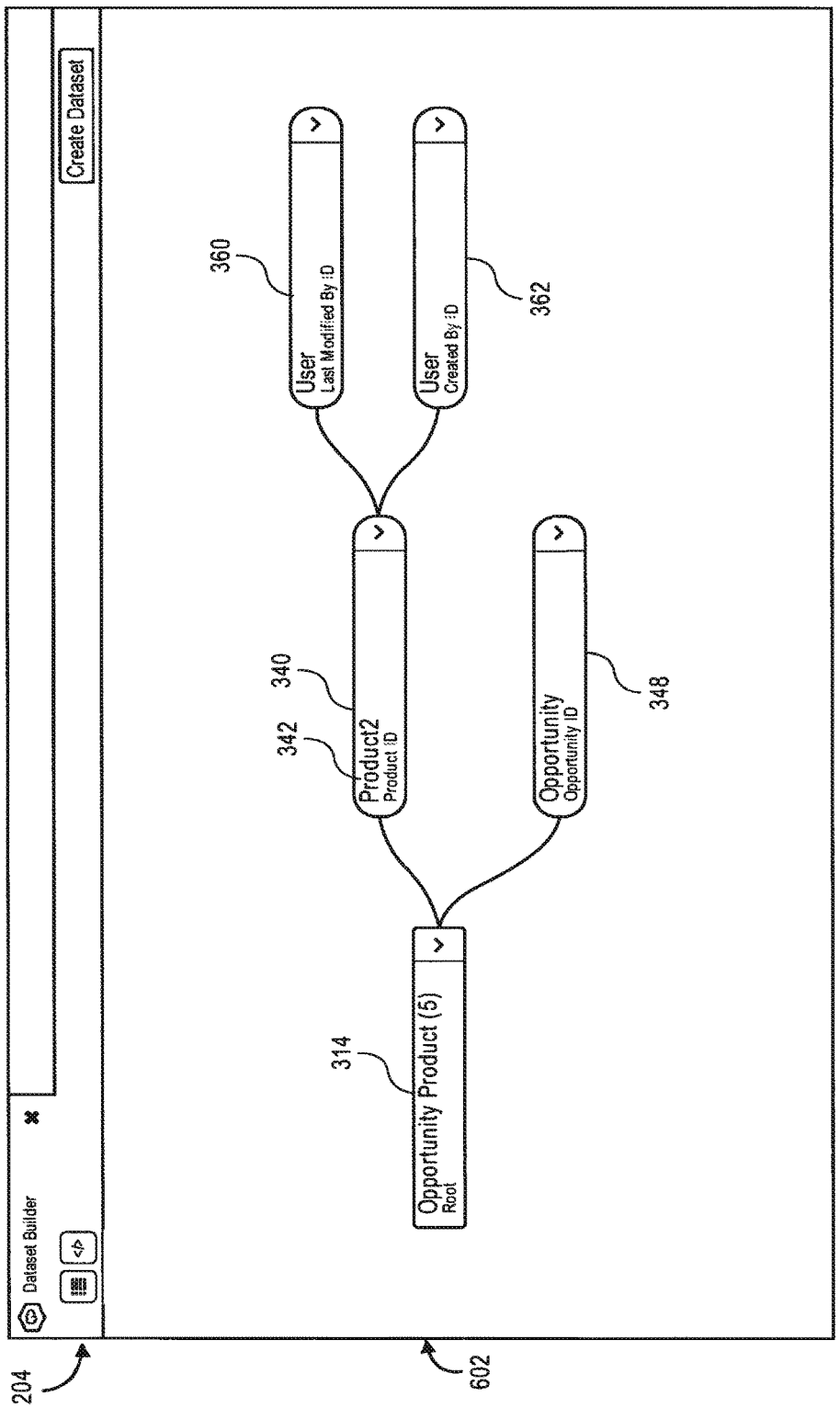
FIG. 6 illustrates a user interface for a data graph representation mechanism after additional objects have been related to an object according to one embodiment.

FIG. 6 shows a further development of the graph representation in which additional objects have been related to the Product2 object 340. The title bar 342 for the Product2 object is modified by adding an indicator, (2), to show that two objects have been related to the object. The two objects User-Last Modified by ID 360, and User-Created by ID 362 are also indicated in the graph representation using branches coming off of the object to which they have been joined. The two new objects are shown by example only. Any other related object may be joined in addition to or instead of those shown. In this way, the graph representation may be used to show existing relationships, new relationships and changes to the relationships. The dataset is indicated as a hierarchy so that object joins and relationships may easily be observed.

The graph representation mechanism 110 analyzes the data and the relationships in the data and provides the appropriate selections based on the context. The objects, fields, and relationships that are displayed as choices are restricted to only those that are correct choices for the current object and the current level in the dataset tree. This level in the tree is easily understood using the graph representation. As the user makes selections, the graph representation mechanism stores these choices as criteria for generating the dataset.

Figure 7:
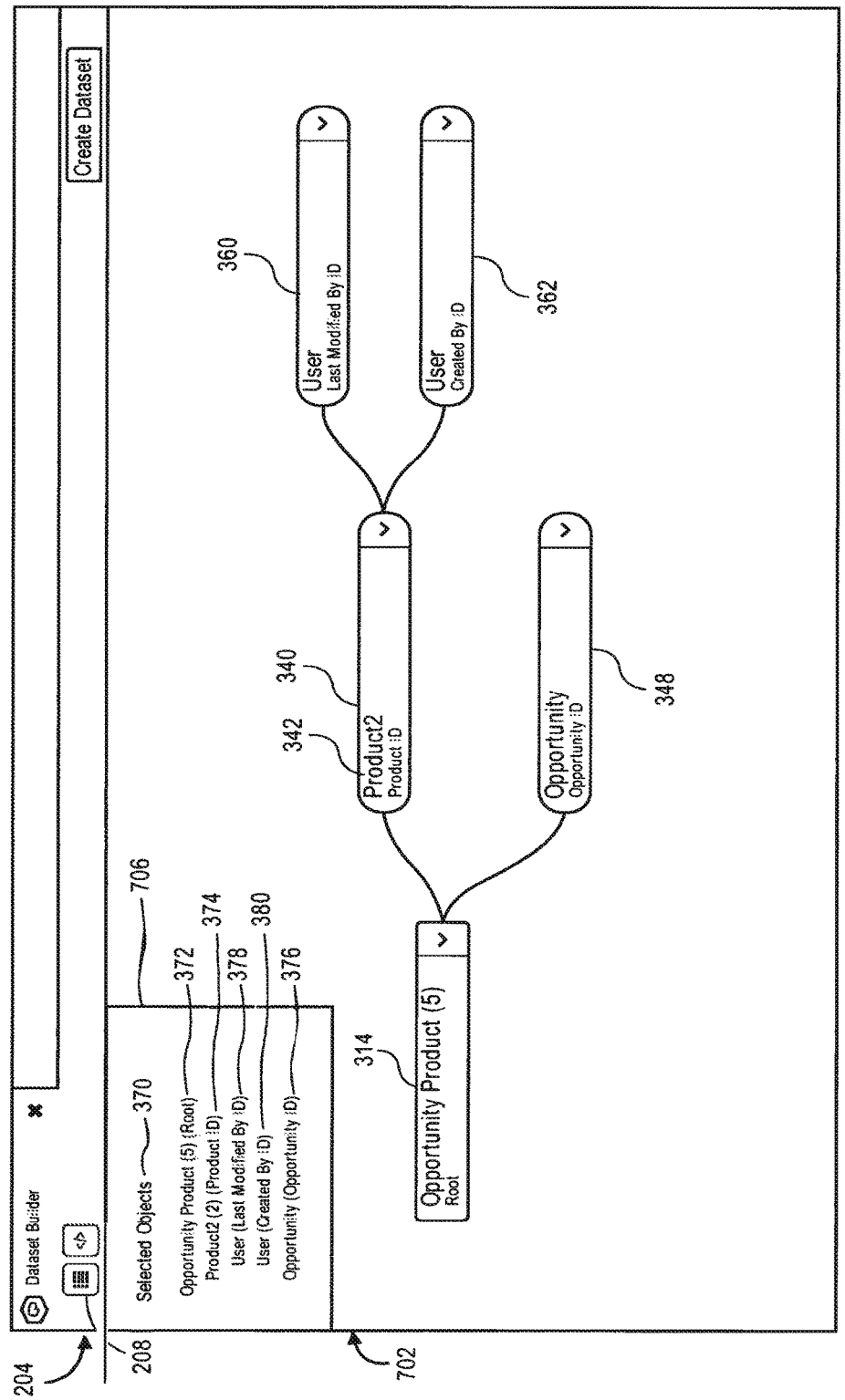
FIG. 7 illustrates an object list for a data graph representation according to one embodiment.

FIG. 7 shows an object list in a user interface. The same graph representation is shown as in FIG. 6 and includes the root node 314, the two selected objects 340, 348 that were joined to the root node and the two selected objects 360, 362 that were joined to the Product2 node. While only a few joined objects are shown, there may be more or fewer depending on the dataset that is desired by the user and established by the system. The same objects and relationship as are shown in the graph representation are also shown in an object list view 706. This view may be commanded by the user selecting the list button 208.

The object list view shows a title 370 of selected objects, and then a hierarchical list. Each level is indicated by an indent. The root level 372 is the "Opportunity Product." The listing is enhanced by parentheticals to indicate the number of selected fields, 5, and the hierarchical level, root. The first indent indicates the two objects 340, 348 that were joined to the root node. These are listed with indented titles 374, 376 that also have parentheticals to show the number of joined objects, 2, and the selected field. A second indent indicates the two objects 360, 362 that were joined to the Product2 object. These are listed with further indented titles 378, 380 and enhanced by additional parenthetical information.

The object view list 706 may be context-sensitive so that the user first selects an object, then the list button. Such a sequence may be used to cause the object view list to be generated with the selected item as the root item for the list. The selected item is displayed with no indent and only items joined to that object or items joined to joined objects are displayed. As an example, if the Product2 object were first selected and the list view were generated based on that object, then several objects would be excluded from the list view. First, any objects to the left in the graph representation, that is objects at a higher level, in this case "Opportunity Product" are not included in the list. In addition, other objects at the same level, in this case "Opportunity," are not displayed. Finally any objects joined to any other objects at the same level and a higher level are not displayed.

FIG. 7 is an illustration of an alternate view of the data graph representation or extract graph. The extract graph presents a data extraction definition of metadata of relational systems. The presentation of FIG. 7 allows the user a way to explore and navigate through the graph representation that was described above in the examples. The extract graph is transformed into other formats such as a linear object tree or an object list or JSON to provide the user with an alternative view of the graph for easy navigation and summary.

This view provides a summary view of all the objects that have been selected along with the object hierarchy. This view provides an alternate way for users to see the object hierarchy. Different products and different joins are presented in a single view. The summary view is shown before the data extraction is finalized.

Figure 8:
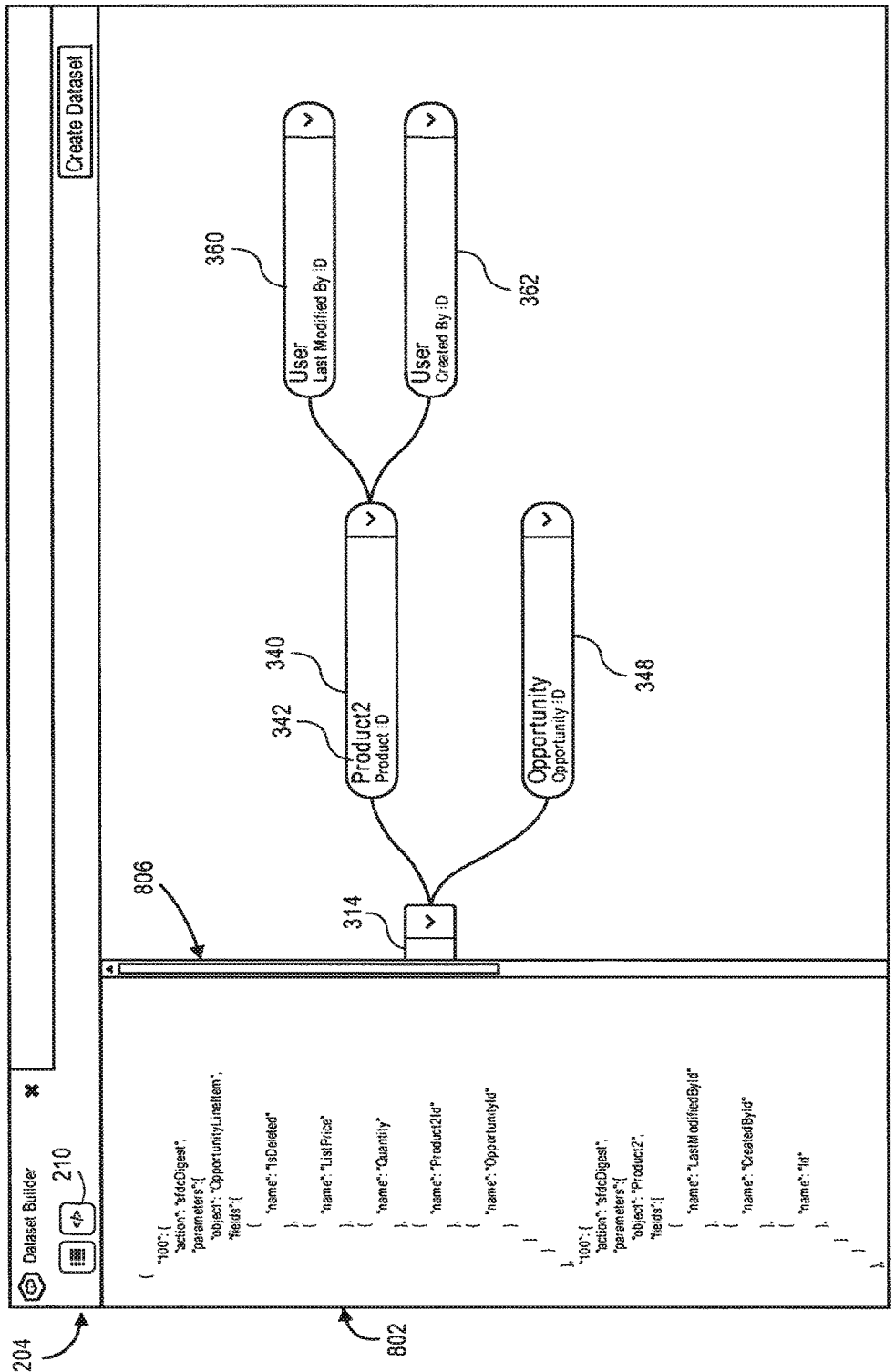
FIG. 8 illustrates a user interface with a source code listing for a data graph representation mechanism according to one embodiment.

FIG. 8 is a diagram of the user interface in which the source code button 210 has been selected instead of the list button. The data extraction navigation mechanism accordingly presents a source code for the dataset extraction. This source code is generated based on the user selections described above. In the illustrated example, the source code is presented in a JSON (JavaScript® or ECMA Script Object Notation) language, however, the system may be adapted to support any other suitable language. For some viewers, the source code presentation allows the selections to be reviewed quickly and accurately.

The user interface may also allow the user to edit the source code directly. In such a circumstance, the data graph representation allows the data extraction to be defined quickly without a deep knowledge of the data and the database structure. The user may define much of the extraction using selections from lists. Having made the basic selections and defined the major categories, levels, and relationships, the extraction may then be refined directly in the source code. The source code of FIG. 8 is reproduced below where "sfdc digest" refers to a title that has been given to this specific extraction.

```
{
    "100" {
        "action": "sfdcDigest",
        "parameters": "OpportunityLineItem",
        "fields": [
            [
                "name": "IsDeleted"
            ],
            [
                "name": "ListPrice"
            ],
            [
                "name": "Quantity"
            ],
            [
                "name": "Product2Id"
            ],
            [
                "name": "opportunityId"
            ]
        ]
    },
    "101": [
        "action": "sfdcDigtest",
        "parameters": [
            "object": "Product2"
            "fields": [
                [
                    "name": "LastModifiedByID"
                ],
                [
                    "name": "CreatedById"
                ],
                [
                    "name": "Id"
                ]
            ]
        ]
    ]
}
```

Figure 9:
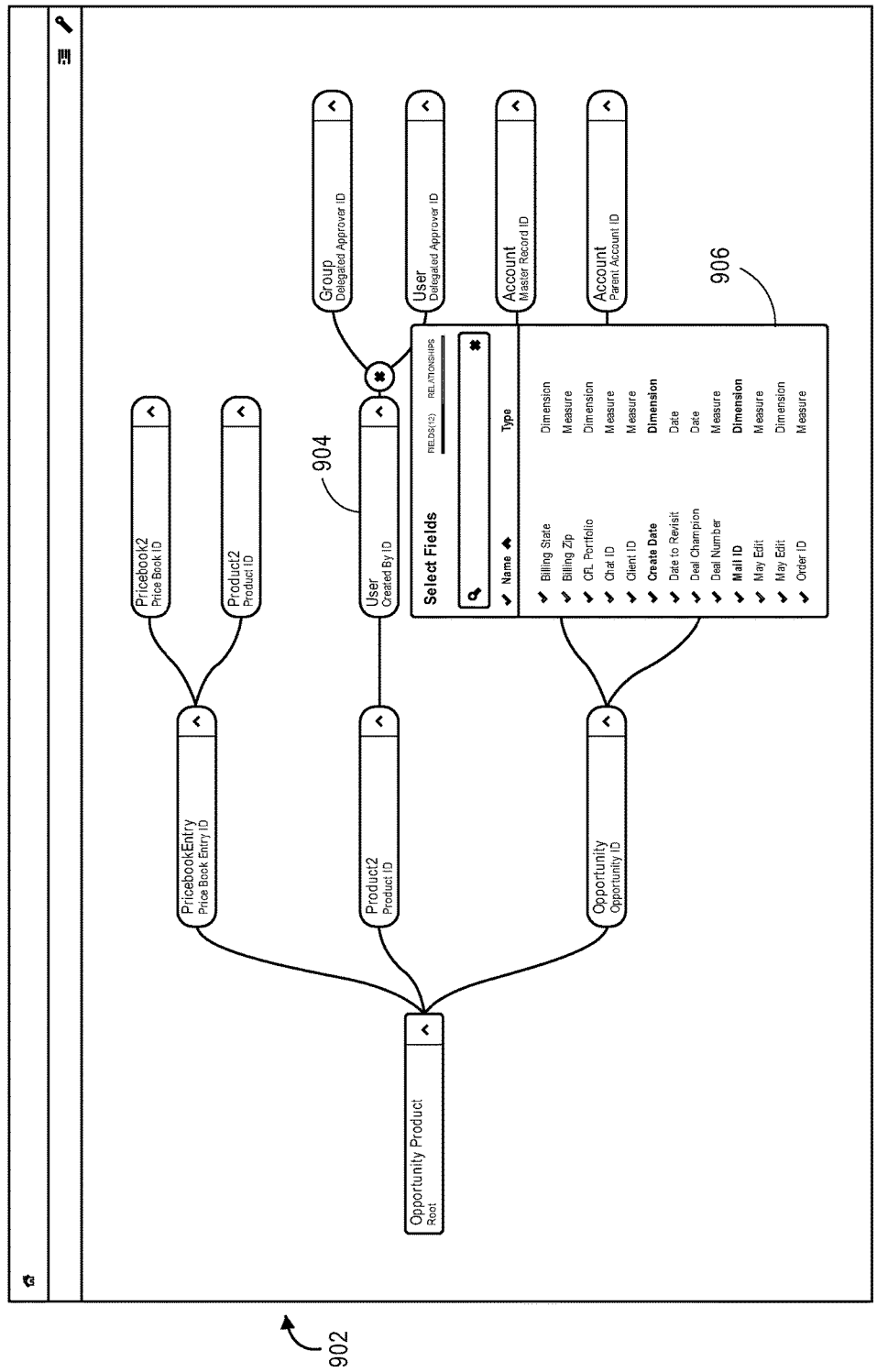
FIG. 9 illustrates a user interface for field selection with a data graph representation mechanism according to one embodiment.

FIG. 9 is another diagram of database objects and relationships between these objects in the form of a graph representation 902 similar to that of FIG. 5. Such a graph may be produced by a data graph representation mechanism 110. In the illustrated example, the root on the left is again an Opportunity Product. This root is related to and joined to PricebookEntry, Product 2, and Opportunity. Pricebook Entry is related to and joined to PriceBook2 and Product2. Product2 is related to and joined to User-Created by ID 904. User is related to and joined to Group and User. User-Created by ID 904 has a field selection drop-down box 906 activated by user selection. Opportunity is related to two other items that are obscured by the field selection box 906. One of these obscured items has been joined to two Account objects, Account-Master Record ID and Account-Parent Account ID. The field selection box 906 shows that there are many fields to select for this object and that two have been selected so far, Create Date, and Mail ID.

FIG. 10 shows the options field selections table 906. The table allows many options to be selected by name and type. For each selected field for the object, a related objects selection table 908 is presented. This allows related objects to be joined or for joins to be deleted. For each selected object more related objects may be joined. The table shows different related objects allowing different related objects to be joined. The second table 908 is reproduced as a third table view 910 showing that additional metadata is displayed when the user hovers over an item. As shown, hovering over Opp_Last_Modified causes the long name of the field to be displayed. Hovering over Type C causes Custom Object, an explanation of the code C to be displayed. These tables allow a user to find and specify the fields and relationships between two objects to join the objects. Relations may also be modified.

FIG. 11 is a user interface diagram for the same active node 904 showing options that may be presented. This diagram shows only one active node in order to simplify the drawing figure, however, the other nodes may be shown together with this active node. The user may also select to zoom in on a particular node or area of the graph representation in order to make further selections easier. The active node has a menus selection button 914, an Add Fields button 916 and an Add Objects button 918. This interface may be provided with the graph representation tree shown and described above to present various functions more clearly. Alternatively, one or more of these options may be removed or changed. Additional options may be added to suit different implementations. For this User-Created by ID node 904, the user may add fields by making a selection.

FIG. 12 shows the same active node 904 as in FIG. 11. Here the user has selected the menu button and a menu is presented with any of a variety of structural options for saving and modifying the graph representation and underlying data extraction. By selecting the menu button 914, the user may select to delete a sub-graph, add filters, save the sub-graph as a template or optionally execute other menu options.

FIG. 13 shows the same active node 904 as in FIG. 11. By selecting the add fields button 916 (FIG. 11) any of a variety of different add fields tools may be provided. In this example, the add fields button, invokes the field selection table 906 for the object. The user may select desired fields and joins or relations for the object. In this example, the field selection table tracks the number of fields that have been added as 12. This alerts the user to the total number of selections and therefore the amount of data that will be produced when the data extraction is performed. Since only some of the selected fields are visible, the total number serves as a reminder of previous selections that are currently not shown.

FIG. 14 shows the same active node 904 as in FIG. 11. The user may invoke a different selection table 912 similar to that of FIG. 5 and select objects based on a selected field. As shown, various objects and relationships are shown in a single screen. In this example, a templates view provides related fields for object selection. In addition the Add Fields button 916 shows the total number of fields. This is an aid to object selection.

The metadata stored in lookup field definitions may be used to display and finally assemble the illustrated join conditions. A SOQL (Salesforce Object Query Language) for the flattened dataset may be generated as well as an Insights ELT (Extract Load Transform) workflow definition.

It is contemplated that any number and type of components may be added to and/or removed from a data graph representation mechanism 110 to facilitate various embodiments including adding, removing, and/or enhancing certain features. For brevity, clarity, ease of understanding, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

FIG. 15 illustrates a data preview of de-normalized data that might be obtained by selected objects, relations, and joins similar to those described above. The illustrated data represents a preview of data that would be extracted in a final de-normalized form. Such a data preview may be presented while building the extract and relationship graph as shown above. This provides a way to edit the metadata and clean the data. The data preview also provides a sample of information to assist in building the graph representation. The sample data can also be visualized and explored to identify potential data quality issues. The data preview may be used iteratively with the graph representation, the list representation and the source code representation to improve the results before a full extraction is performed.

Figure 16:
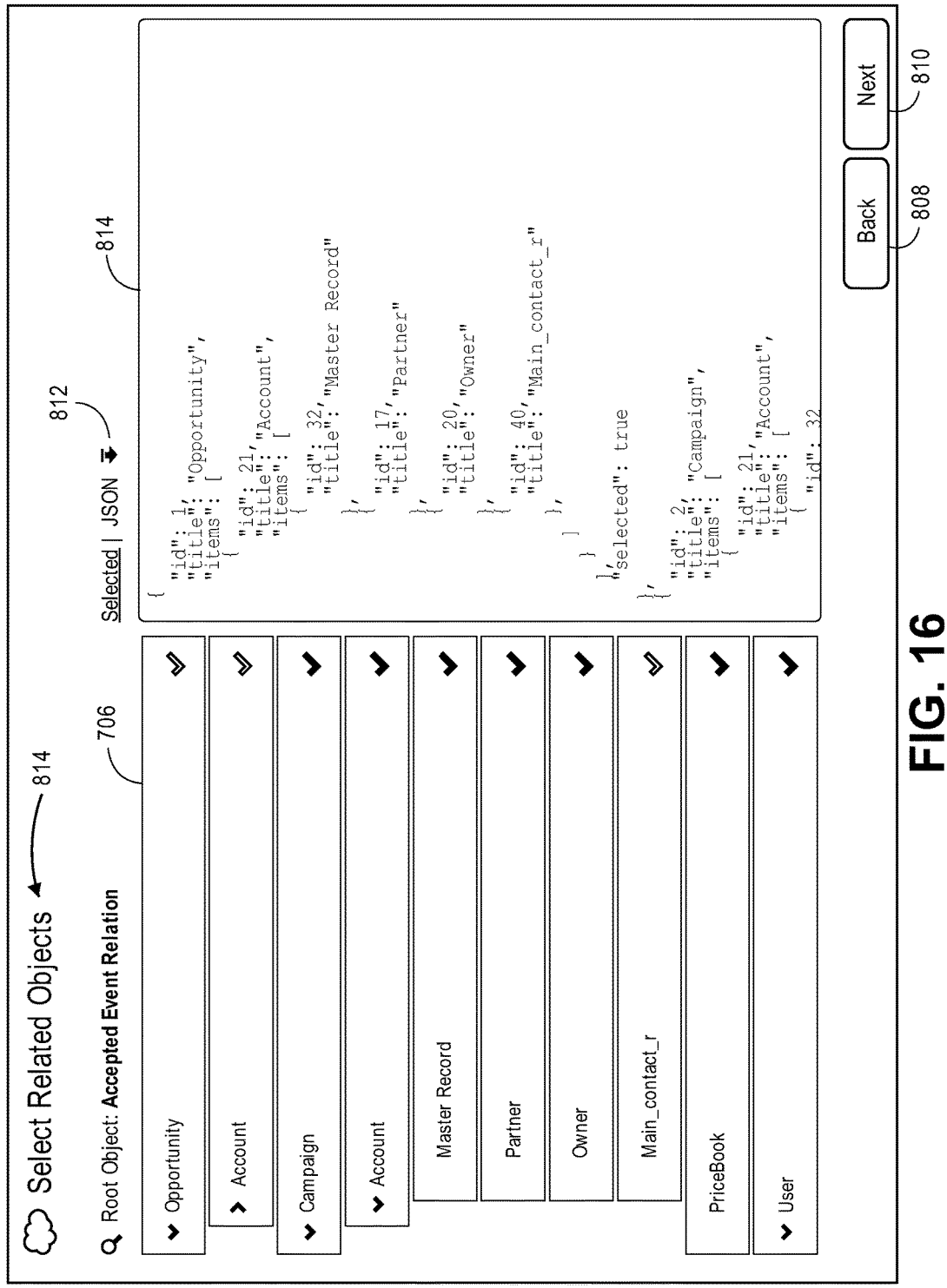
FIG. 16 illustrates a user interface with an object tree and a source code for a data extraction navigation mechanism according to one embodiment.

FIG. 16 is a diagram of another alternative representation and user interface of the dataset for extraction. In this example, a summary of the selected objects and joins is presented along with the related JSON file of the object hierarchy. This user interface combines the tree list 706 of FIG. 7 with the JSON listing 806 of FIG. 8. There are also some navigation buttons 808, 810, a source code download button 812, a title bar 814 and other navigation and command buttons. For a user that prefers the textual representation to the graph representation, this presentation of the extraction set may be easier to use and view. The JSON and the tree list may be made downloadable as the user is building it. A user may download the extraction set selection to a local machine, modify and adjust the JSON and then reuse the JSON file when building another object extraction or refining the current extraction.

FIG. 17 illustrates a graph with multiple nodes or branches. To optimize the data extraction process, the object-relationship graph may be traversed through multiple passes to ensure that extraction fields on the same object are coalesced. An extraction may be defined by sequential steps. In many cases the results of each step may be used by one or more future steps. Instead of traversing the graph once and converting each graph node into a sequential list of steps, the graph is traversed in multiple passes. During each pass the results that may be reused from a step in other branches or nodes of the graph are considered. The entire graph is traversed once to get a high level view. This first pass is used to figure out what is needed and what can be reused. Then a final list of steps is generated. Shared and reusable steps are placed at the top or before steps that are not shared or reused. These steps are then reused in later steps so that they do not have to be performed twice. This optimizes dataflow because graph traversal is trivial in comparison with executing the actual steps in the extraction.

The graph of FIG. 17 is a simplified example to show how dataflow may be optimized. The graph shows the following sequential nodes:

Accounts→Territory→Territory Manager User
Created By User

To operate this graph all accounts are extracted and then joined to territories and users as both created by and territory manager. Without dataflow optimization, an extraction would be created that fetches all users in the data repository each time the users need to be joined to something. For a large number of user records, the extraction may become very slow. The dataflow optimizer is able to extract "user" once in the first pass before the first join of "user" and then reuse the results from the "user" extraction in multiple later steps.

The tools described above facilitate faster and more accurate data extraction by using a data graph representation mechanism for data storage repositories. Objects may be joined automatically with a simple selection from a user. Using the data graph representation, a user is able to define the relationships, define joins and define fetches. This is done by accessing lists in dialog boxes and making direct selections. The lists may be generated to only contain choices that will work. In other words instead of using SQL or some other tool to discover the structure of the data, the underlying schema of the database is visually represented by the data graph representation. This allows a query to be built quickly even in a multitenant environment.

The data graph representation mechanism may be configured to leverage a dictionary, such as the Salesforce.com® UDD (Universal Data Dictionary) to help the user define possible joins and extractions. As a result, the metadata stored in lookup field definitions may be used to display and finally assemble join conditions after a user selects a join. The user does not need to manually define a join condition, however, this may be done by modifying source code, if desired.

In the dataset extraction, a SOQL (Salesforce Object Query Language) for the flattened dataset, an Insights ELT (Extract Load Transform), or any other workflow definition, may be generated. Before an extraction is executed a dataset preview may be used. By presenting a part of the extraction in a final de-normalized form, the user can fine-tune the extract and relationship graph using the data graph representation or source code. This may be used to provide a way to edit the metadata and then clean the data. Previewed sample data can also be visualized and explored to identify potential data quality issues.

Figure 18:
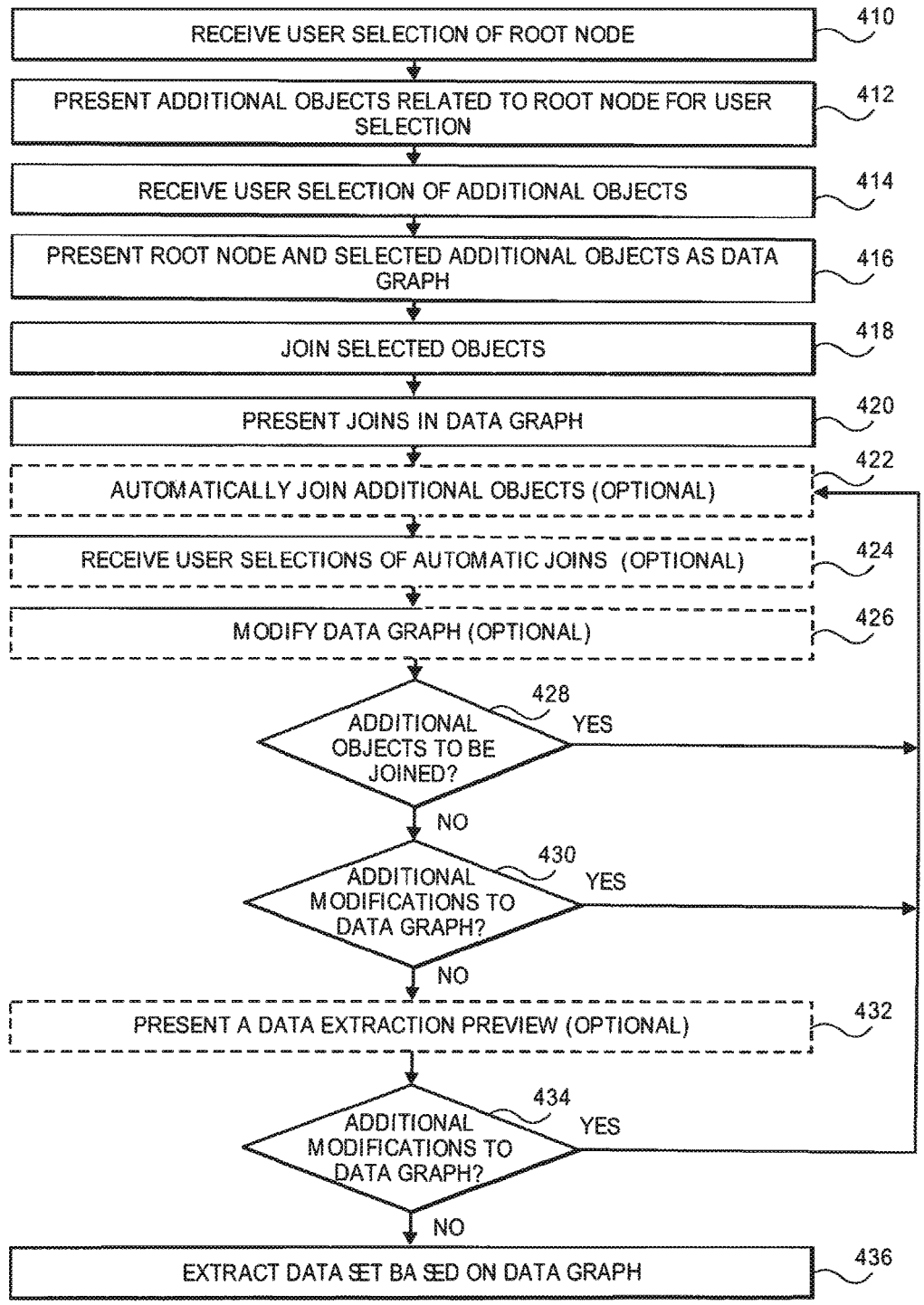
FIG. 18 illustrates a method facilitating a data graph representation mechanism according to one embodiment.

FIG. 18 is a process flow diagram of presenting and using a data graph representation of a dataset for extraction of a dataset from an object-oriented database as described above. At 410 the data graph representation mechanism receives a user selection of a root node. The root node is an object in an object-oriented database. The root node may be selected from a list presented to the user or based on a search or any other mechanism presented to the user.

At 412, the data graph representation machine presents additional objects to the user that are related to the root node based on fields and properties in the object-oriented database. Any one or more of these objects may be selected by the user to be added to the data graph representation. In the examples above, the objects are fields and relationships, however, the invention is not so limited.

At 414, the system receives a selection of one or more of the additional objects by the user and at 416 the root node and the selected additional objects are presented to the user in the data graph. The user may then navigate within the data graph representation to add to and to modify the extraction dataset. At 418, the selected additional objects are joined to the root node and at 420 these joins are presented in the data graph.

At 422, the system may aid the user in further developing the data graph representation by automatically joining objects in the object-oriented database based on fields and properties of those objects. A data dictionary may be used by applying it to database objects to define possible joins and extractions based on fields and properties in the database. Additional objects may be found by applying metadata stored in lookup field definitions of the objects. The metadata may be used to display and to assemble join conditions.

The new automatically joined objects are presented to the user as options and at 424, the system receives user selections of one or more of the automatic joins. At 426 the data extraction is further modified in response to the received automatic join selections. These modifications are indicated in the data graph representation so that they are immediately visible to the user.

At 428 if there are any further objects to be joined, then the user may return to select more automatic joins or even manual joins. The data graph representation will then be modified accordingly. At 430 if there are any additional modifications to the data graph, then the user may select additional modifications and the modified data graph is presented. The modifications at any one of these stages in the process may include adding joins, deleting joins, adding objects, including nodes of the data graph and fields of the database. User selections may include the selection of one or more additional objects. The selection may include a definition of object relationships, joins, and fetches.

At 432 a preview of the extracted dataset may be presented to the user. This preview may be offered upon receiving a user command at almost any time in the data graph modification process. The preview allows the user to see a portion of the data that will be extracted. The data may be presented in a de-normalized form for easier viewing. After reviewing the preview if there are additional modifications to be made to the data graph, then the user may return to make further selections. The system will modify the data graph and provide additional data preview if a command is received. All of the selections and modification may be performed on a single user interface screen as shown in the example figures above.

After the data graph representation has been finalized then at 436 a dataset is extracted from the object-oriented database based on the data graph. The dataset may be extracted in a different ways. In some embodiments, an Object Query Language query is generated for a flattened dataset and the query is used to extract the dataset. The query may be based on the data graph or on underlying source code.

End-to-end integrity and stronger guarantees are provided as described herein by a data extraction navigation mechanism coupled to the data storage repositories. This system transforms a data graph representation into other formats and alternative views. These views may be for example a linear object tree or an object list or some type of code structure such as JSON. These views may be used to provide a summary of all the objects that have been selected along with the object hierarchy. This allows the user to review every item selecting in building the data graph representation before performing the dataset extraction.

With a downloadable JSON file of the object hierarchy, the user is able to study what has been built. The downloaded code may be modified and uploaded for the same or for another dataset extraction. Using the same JSON as a foundation, the code may be transformed into a data graph. The data graph may then be modified and transformed back into JSON. This provides a way for users to modify and reuse code for the same or for another object extraction.

Figure 19:
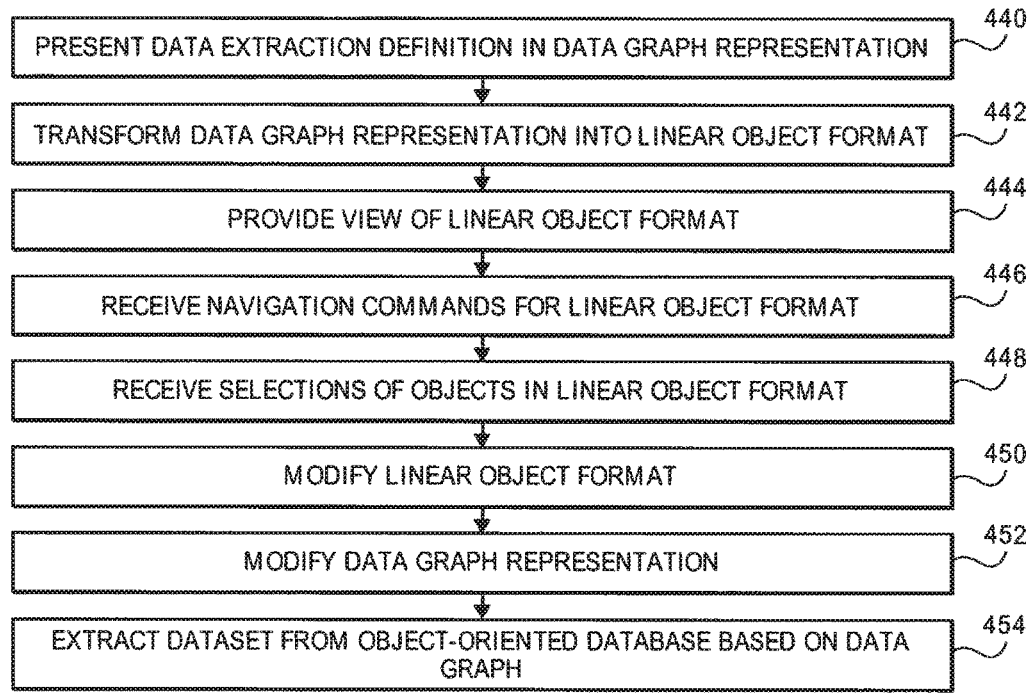
FIG. 19 illustrates a method facilitating a data extraction navigation mechanism according to one embodiment.

FIG. 19 is a process flow diagram of using transformations to modify a data graph representation as described and shown above. This process starts at 440 by presenting the data extraction definition in a data graph representation. The user is then able to operate on this presentation as described above in the context of FIG. 18 or using any of the other tools, techniques, and structures described herein. At 442, the data graph representation is transformed into a linear object format and at 444 a view of the objects of the same data extraction definition are provided to a user or programmer in the linear object format. As mentioned above, this linear object format will typically, but not necessarily, include an object hierarchy and object metadata from the object-oriented database, such as a tree and object list with relationships, such as joins between objects. Alternatively, the linear object format may be a type of source code that may be analyzed and edited directly by a programmer. One example of such a source code format is JSON but the invention is not so limited.

At 446 the system receives navigation commands from a user or programmer to navigate through the linear object format. This may be provided as user interface device input through the displayed tree and object list. After some navigation, at 448 the system receives selections of objects in the provided view of the linear object format. At 450, any selected object may be modified. Relationships and metadata may also be modified. At 452 the data graph representation is modified based on the modifications to the linear object format. The modified data graph representation is then used as the basis for the data extraction definition and then used at 454 to extract a dataset from the object-oriented database based on data graph representation.

Data extraction from an object-based data repository may be made faster and more accurate using a dataflow optimization mechanism. An object-relationship graph may be generated to characterize the extraction and then traversed through multiple passes before data is extracted. The multiple passes may help to coalesce extraction fields on the same object.

In one embodiment, the entire object-relationship graph is traversed once to get a high level view, to determine what is needed and to determine what can be reused. When a final list of steps is generated for the extraction, then the shared and reusable steps may be placed before any other steps. As an example, it may be possible to merge some extract steps so that the whole process runs with fewer total extract steps. These steps may also be reused in later steps. The data extraction is made to be more efficient because graph traversal is simpler than executing the extraction steps.

The data extraction may be further improved by defining the specific fields that are to be extracted. The data extraction may be de-duplicated based on the defined fields. This new set of fields is then extracted first and then specific joins for those fields are extracted.

Dataflow optimization can be applied directly to a dataflow definition that states which data is to be extracted, transformed and loaded into a format usable by data analytics tools. As described above, the dataflow definition may be generated using the dataset builder and graph representation tools shown and described herein. To make things easier for the extraction engine, the graph representation tools may also perform a transparent optimization step before sending the dataflow off to be run by the extraction engine. In embodiments, a denormalized flat format is used. This provides a smoother flow with the UI. The dataflow defines how the extraction engine is to extract the data, transform it, if necessary, and finally denormalize everything into this flat format.

As an example, consider a dataflow that has two "User" object extractions. The "User" object is joined to the "Opportunity" object twice, once for "Created By" and another for "Modified By." Each join has different fields selected from the "User" object. A direct dataflow extraction would be to extract the "User" object twice, each time with a different set of fields, and join it to "Opportunity." This dataflow would be faster if the "User" object is extracted once and all of the selected fields are extracted the first time because extracting an entire object twice is much slower than extracting the object once with extra fields.

The dataflow optimization identifies the multiple extractions of the "User" object and all of the desired fields in the first pass. The first pass step finds all the common objects and merges them into a single extract step with all fields selected. In the second pass, the extraction is performed and the unnecessary fields are filtered out from each join or augment step. The same "User" object extract step is reused for each join. While the total improvement in this simple example is not great, for large databases and for complex data extraction definition, there may be a significant improvement in extraction speed and efficiency.

Figure 20:
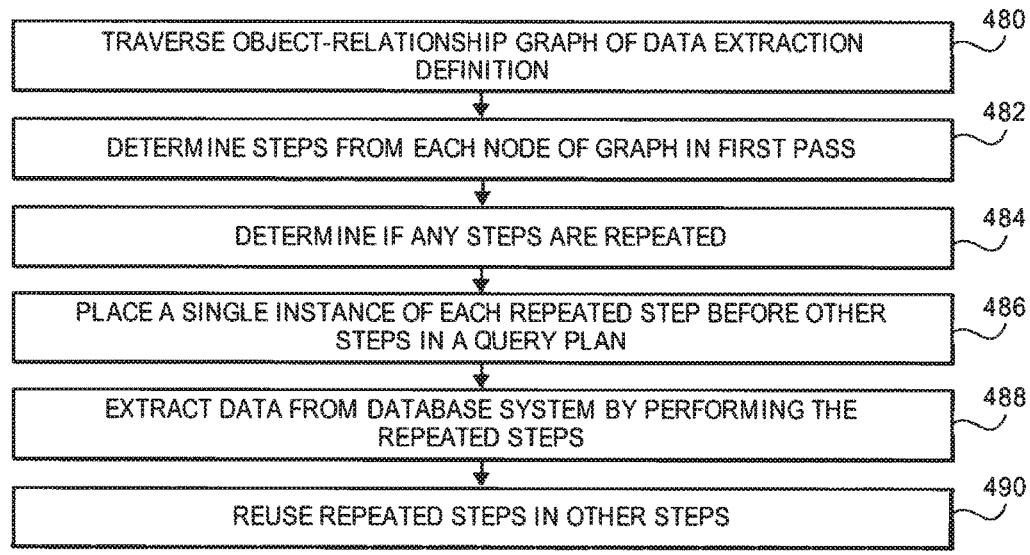
FIG. 20 illustrates a method facilitating a data flow optimization mechanism according to one embodiment.

FIG. 20 is a process flow diagram of performing a dataset extraction using multiple passes to coalesce extraction fields. In this example, at 480 the object-relationship graph of the data extraction definition is traversed in a first pass. The data extraction definition is generated using any one or more of the techniques, structures and tools described above. The object-relationship graph is useful structure for this operation because it defines the relationships, joins and fetches of the data extraction definition. The data extraction definition typically has a series of sequential step. However, the results of some of the steps will be used by one or more of the other steps in the sequence. At 482 the operational steps are determined from each node of the graph in the first pass. These steps are typically data extraction steps in which data defined in the data extraction definition is extracted from the object-oriented database.

At 484, it is determined if any of the steps are repeated in the first pass. In the event that there is a repeated step, then at 486 a single instance this repeated step and any other repeated steps may be placed before other steps in a query plan. The data is then extracted at 488 in a second pass from the object-oriented database by performing the repeated steps that were placed before and then reusing the results from the repeated steps in the later repetitions of these repeated steps.

When a later repeated instance of the repeated step is able to use the prior results, then the step may be deleted from the sequences of steps because these steps are no longer needed. The data extraction definition is modified to reuse the data extracted from the earlier instances of the repeated steps. Additional intermediate passes may be performed to further reduce the number of steps. To further improve the efficiency of the data extraction a super set of field objects of the object-relationship graph may be selected. A subset of the selected super set may then be used for specific joins in the graph.

Figure 21:
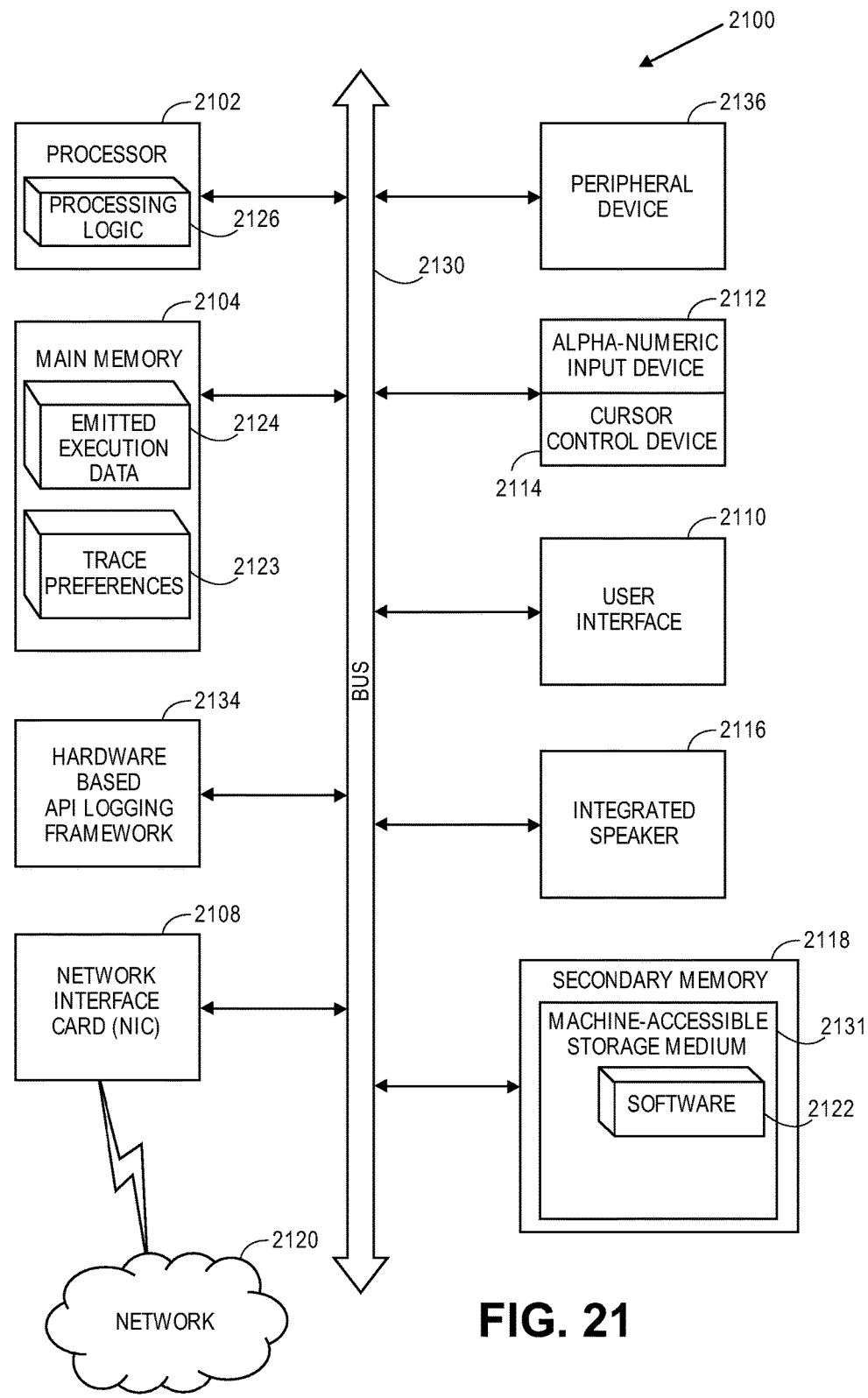
FIG. 21 illustrates a computer system according to one embodiment.

FIG. 21 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 of FIG. 1. In alternative embodiments, the machine may be connected (e.g., networked) to other machines in a network (such as host machine 100 of FIG. 1 connected with a client machine over a network, a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet.

The machine may operate in the capacity of a server or a client machine in a client-server network environment, or as a peer machine in a peer-to-peer (or distributed) network environment or as a server or series of servers, including an environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 352 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of the data graph representation mechanism 110 as described with reference to FIG. 1 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of mechanism 110 as described with reference to FIG. 1 and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon instructions, such as computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 22:
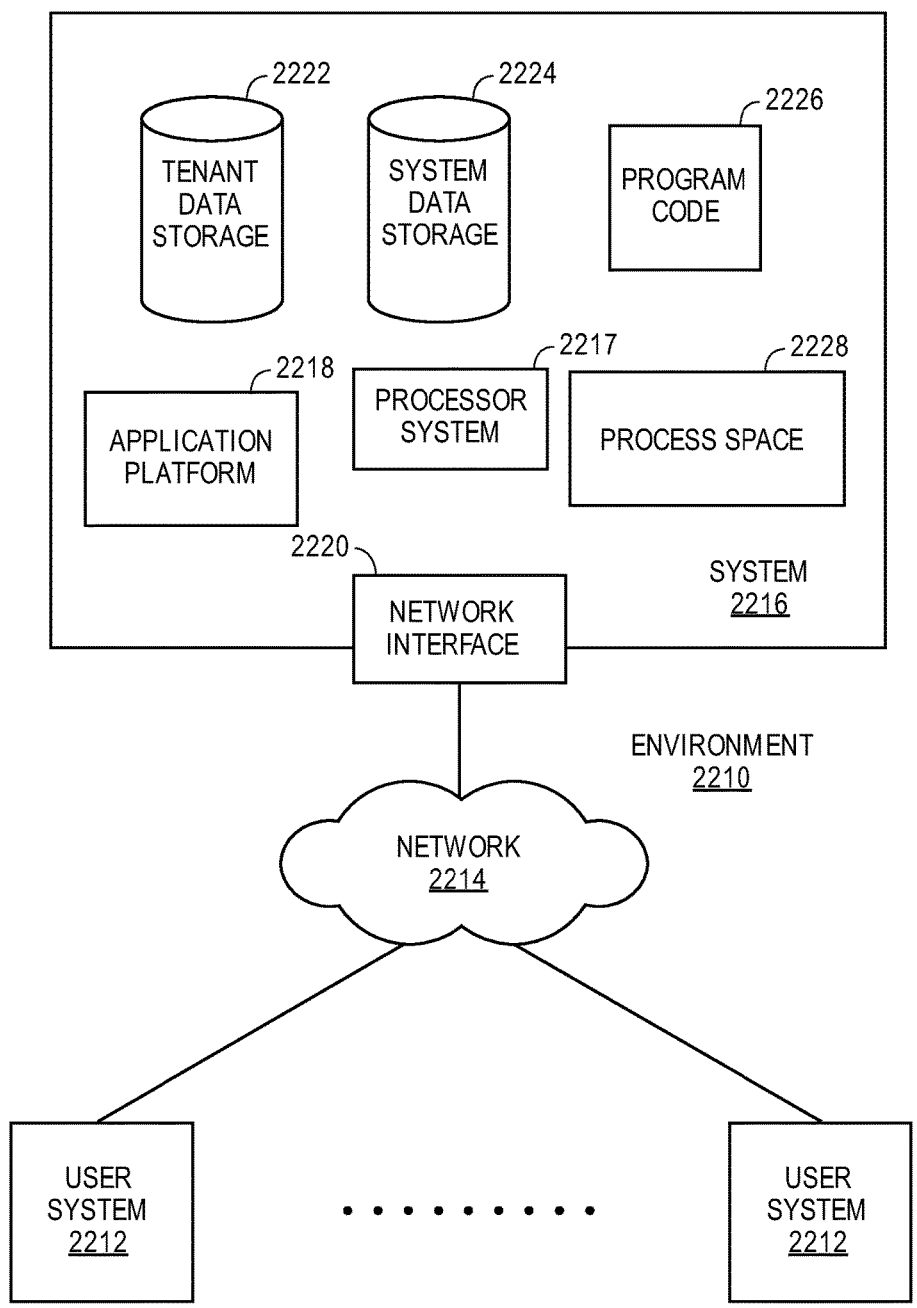
FIG. 22 illustrates an environment wherein an on-demand database service might be used according to one embodiment.

FIG. 22 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

User system 612 may be any machine or system that is used by a user to access a database user system. For example, any of user systems 612 can be a handheld computing device, a mobile phone, a laptop computer, a work station, and/or a network of computing devices. As illustrated in FIG. 22 (and in more detail in FIG. 23) user systems 612 might interact via a network 614 with a database service, which is system 616.

A service, such as system 616, is a database system that is made available to outside users that do not need to necessarily be concerned with building and/or maintaining the database system, but instead may be available for their use when the users need the database system (e.g., on the demand of the users). Some database services may store information from one or more tenants stored into tables of a common database image to form a multi-tenant database system (MTS). Accordingly, "database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the database service, users accessing the database service via user systems 612, or third party application developers accessing the database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 22, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 22, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 22 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 23:
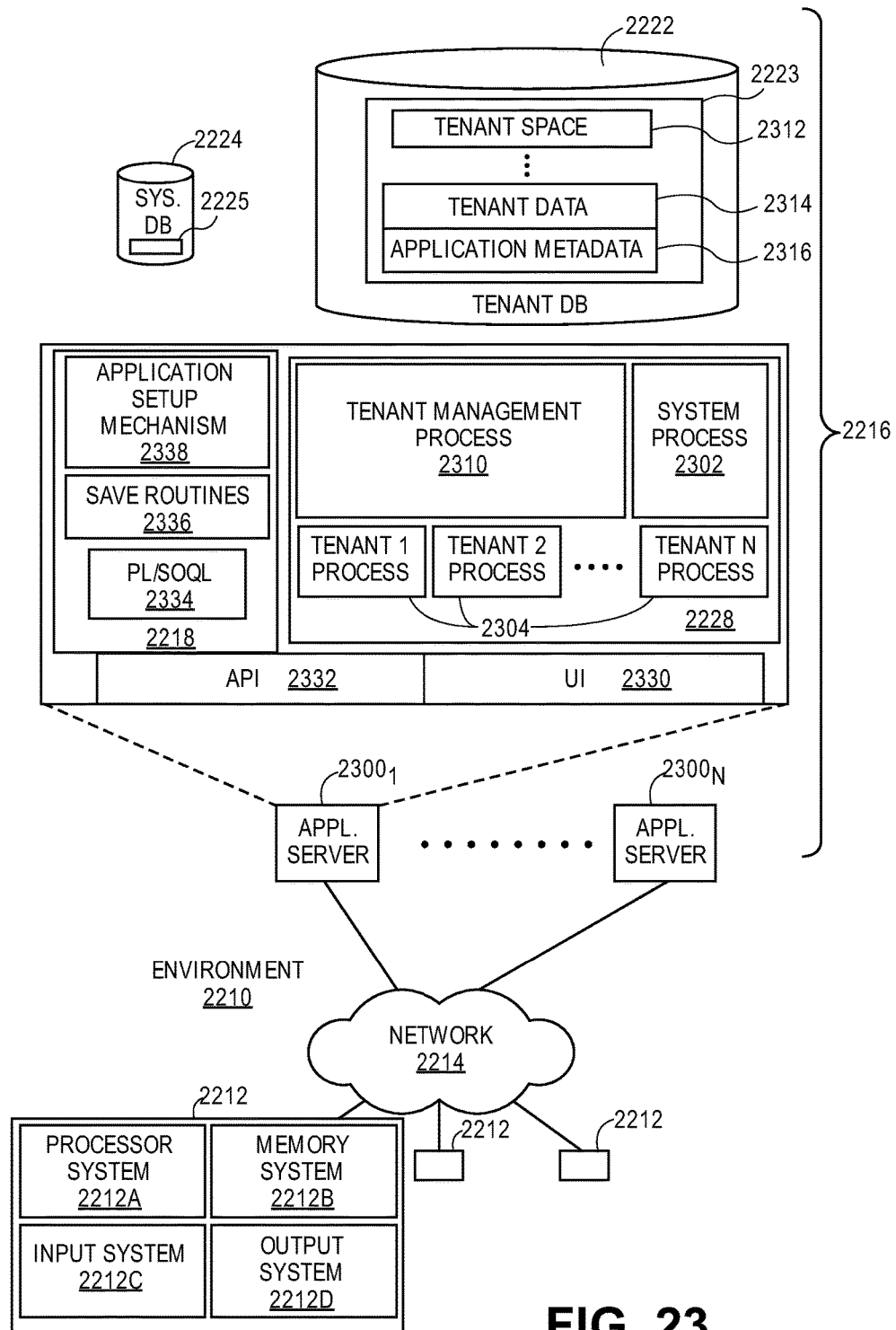
FIG. 23 illustrates elements of environment of FIG. 6 and various possible interconnections between these elements according to one embodiment.

FIG. 23 also illustrates environment 610. However, in FIG. 23 elements of system 616 and various interconnections in an embodiment are further illustrated. FIG. 23 shows that user system 612 may include processor system 612A, memory system 612B, input system 612C, and output system 612D. FIG. 23 shows network 614 and system 616. FIG. 23 also shows that system 616 may include tenant data storage 622, tenant data 623, system data storage 624, system data 625, User Interface (UI) 730, Application Program Interface (API) 732, PL/SOQL (Procedural Language/SOQL) 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 22. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 23, system 616 may include a network interface 620 (of FIG. 22) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled, "Custom Entities and Fields in a Multi-Tenant Database System," issued Aug. 17, 2010 to Craig Weissman et al. and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method performed by a system having at least a processor and a memory therein to execute instructions, wherein the method comprises:
    communicably interfacing an object-oriented database system having a plurality of objects stored therein with the system;
    presenting from the object-oriented database system a data extraction definition in a data graph representation;
    transforming the data graph representation into a linear object format;
    presenting a view of the objects and one or more available joins selectable via user input in the linear object format;
    receiving input from the user device, the received input selecting one or more of the available joins presented in the linear object format;
    modifying the data graph representation in its linear object format to include a newly joined object within the data graph representation based on the input received from the user device;
    performing a multiple pass extraction of a dataset from the object-oriented database system based on the modified data graph representation having the newly joined object represented therein, wherein the multiple pass extraction includes at least:
    (i) a first pass of the data graph representation to identify one or more data extraction operations for a first node or branch that will produce results to be re-used in place of the data extraction operations for a second node or branch, and (ii) a second pass of the data graph representation extracting the dataset from the object-oriented database system based on the modified data graph representation, wherein the extracted dataset is produced by reusing the results from the one or more data extraction operations for the first node or branch in place of the data extraction operations for the second node or branch; and returning the extracted dataset to the user device.

2. The method of claim 1, wherein the object metadata from the object-oriented database defining the object list with relationships between the objects of the data graph representation further defines one or more joins between the objects of the data graph representation and one or more available joins which are selectable via user input.

3. The method of claim 1:
wherein transforming the data graph representation into the linear object format comprises specifying, via the linear object format, at least an object hierarchy for all objects of the data graph representation and object metadata from the object-oriented database defining an object list with relationships between the objects of the data graph representation and the one or more available joins which are selectable via the user input, in which the available joins are restricted to only contain join choices that will work when selected; and
wherein presenting the view of the objects and the one or more available joins having been transformed into the linear object format comprises: displaying to the user device, the object hierarchy and the object metadata from the object-oriented database system.

4. The method of claim 3, further comprising:
receiving navigation commands from a user device to navigate the linear object format;
wherein the navigation commands include user input to (i) navigate the data graph representation, or (ii) to add to the data graph representation, or (iii) to modify the extraction data set, or (iv) to select additional objects to be joined with a root node and presented within the data graph representation, or some combination thereof.

5. The method of claim 1:
wherein the objects metadata serves as an attribute to an object; and
wherein the data graph representation presents objects and relationships between objects.

6. The method of claim 5, wherein modifying the data graph representation comprises both:
(i) modifying the data graph representation in its linear object format to include the newly joined object within the data graph representation based on the input received and presenting again to the user device, the view of the objects to the user device in the modified linear object format having the newly joined object represented therein; and
(ii) modifying the data graph representation based on the based on the modified linear object format variant of the data graph representation.

7. The method of claim 1, wherein the data graph representation comprises nodes, each node representing a sequential list of steps.

8. The method of claim 1:
wherein the data graph representation defines specific fields to be extracted in extracting the dataset; and
wherein the data graph representation displays join conditions using metadata stored in lookup field definitions.

9. The method of claim 1, further comprising transforming the data graph representation to a source code format compliant with Javascript Object Notation.

10. The method of claim 9, wherein the data graph representation contains an object hierarchy within the data extraction definition, the method further comprising:
downloading the Javascript Object Notation compliant source code format of the built object hierarchy;
receiving an upload of a modified version of the Javascript Object Notation compliant source code format; and
modifying the data extraction definition using the modified version of the Javascript Object Notation compliant source code format.

11. Non-transitory computer readable storage media having instructions stored thereupon that, when executed by a system having at least a processor and a memory therein, the instructions cause the system to perform operations including:
communicably interfacing an object-oriented database system having a plurality of objects stored therein with the system;
presenting from the object-oriented database system a data extraction definition in a data graph representation;
transforming the data graph representation into a linear object format;
presenting a view of the objects and one or more available joins selectable via user input in the linear object format;
receiving input from the user device, the received input selecting one or more of the available joins presented in the linear object format;
modifying the data graph representation in its linear object format to include a newly joined object within the data graph representation based on the input received from the user device;
performing a multiple pass extraction of a dataset from the object-oriented database system based on the modified data graph representation having the newly joined object represented therein, wherein the multiple pass extraction includes at least:
(i) a first pass of the data graph representation to identify one or more data extraction operations for a first node or branch that will produce results to be re-used in place of the data extraction operations for a second node or branch, and
(ii) a second pass of the data graph representation extracting the dataset from the object-oriented database system based on the modified data graph representation, wherein the extracted dataset is produced by reusing the results from the one or more data extraction operations for the first node or branch in place of the data extraction operations for the second node or branch; and
returning the extracted dataset to the user device.

12. The non-transitory computer readable storage media of claim 11, wherein the object metadata from the object-oriented database defining the object list with relationships between the objects of the data graph representation further defines one or more joins between the objects of the data graph representation and one or more available joins which are selectable via user input.

13. The non-transitory computer readable storage media of claim 11:
wherein transforming the data graph representation into the linear object format comprises specifying, via the linear object format, at least an object hierarchy for all objects of the data graph representation and object metadata from the object-oriented database defining an object list with relationships between the objects of the data graph representation and the one or more available joins which are selectable via the user input, in which the available joins are restricted to only contain join choices that will work when selected; and wherein presenting the view of the objects and the one or more available joins having been transformed into the linear object format comprises displaying to the user device, the object hierarchy and the object metadata from the object-oriented database system.

14. The non-transitory computer readable storage media of claim 13, wherein the instructions, when executed by the processor, cause the system to perform further operations including:

receiving navigation commands from a user device to navigate the linear object format;

wherein the navigation commands include user input to (i) navigate the data graph representation, or (ii) to add to the data graph representation, or (iii) to modify the extraction data set, or (iv) to select additional objects to be joined with a root node and presented within the data graph representation, or some combination thereof.

15. A system comprising:

a processor and a memory to execute instructions at the system; and a communications interface to an object-oriented database system having a plurality of objects stored therein;

wherein the system is to present a data extraction definition from the object-oriented database system in a data graph representation;

wherein the system is to transform the data graph representation into a linear object format;

wherein the system is to further present a view of the objects and one or more available joins selectable via user input in the linear object format;

wherein the system is to further receive input from the user device, the received input to select one or more of the available joins presented in the linear object format;

wherein the system is to modify the data graph representation in its linear object format to include a newly joined object within the data graph representation based on the input received from the user device;

wherein the system is to extract a dataset from the object-oriented database system via a multiple pass extraction based on the modified data graph representation having the newly joined object represented therein, wherein the multiple pass extraction includes at least:

(i) a first pass of the data graph representation to identify one or more data extraction operations for a first node or branch that will produce results to be re-used in place of the data extraction operations for a second node or branch, and (ii) a second pass of the data graph representation extracting the dataset from the object-oriented database system based on the modified data graph representation, wherein the extracted dataset is produced by reusing the results from the one or more data extraction operations for the first node or branch in place of the data extraction operations for the second node or branch; and wherein the system is to return the extracted dataset to the user device.

16. The system of claim 15:

wherein the system is to transform the data graph representation into the linear object format by specifying, via the linear object format, at least an object hierarchy for all objects of the data graph representation and object metadata from the object-oriented database defining an object list with relationships between the objects of the data graph representation and the one or more available joins which are selectable via the user input, in which the available joins are restricted to only contain join choices that will work when selected; and wherein the system is to present the view of the objects and the one or more available joins having been transformed into the linear object format by displaying to the user device, the object hierarchy and the object metadata from the object-oriented database system.

17. The system of claim 15, wherein the system is to further receive navigation commands from a user device to navigate the linear object format;

wherein the navigation commands include user input to (i) navigate the data graph representation, or (ii) to add to the data graph representation, or (iii) to modify the extraction data set, or (iv) to select additional objects to be joined with a root node and presented within the data graph representation, or some combination thereof.

18. The system of claim 15:

wherein the data graph representation comprises nodes, each node representing a sequential list of steps; and wherein the data graph representation defines specific fields to be extracted in extracting the dataset.

19. The system of claim 15, wherein the mechanism is further to transform the data graph representation to a source code format compliant with Javascript Object Notation.

20. The system of claim 19, wherein the data graph representation includes the object hierarchy within the data extraction definition, and wherein the mechanism is further to:

download the Javascript Object Notation compliant source code format of the built object hierarchy;

receive an upload of a modified version of the Javascript Object Notation compliant source code format; and modify the data extraction definition using the modified version of the Javascript Object Notation compliant source code format.

* * * * *